(12) United States Patent
Kanno

(10) Patent No.: US 9,197,101 B2
(45) Date of Patent: Nov. 24, 2015

(54) WIRELESS ELECTRIC POWER TRANSMISSION APPARATUS

(71) Applicant: Panasonic Corporation, Osaka (JP)

(72) Inventor: Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 528 days.

(21) Appl. No.: 13/686,104

(22) Filed: Nov. 27, 2012

(65) Prior Publication Data

US 2013/0134796 A1 May 30, 2013

Related U.S. Application Data

(60) Provisional application No. 61/564,370, filed on Nov. 29, 2011.

(51) Int. Cl.
*H02J 17/00* (2006.01)
*B60L 11/18* (2006.01)
(Continued)

(52) U.S. Cl.
CPC ............... *H02J 17/00* (2013.01); *B60L 11/182* (2013.01); *H02J 5/005* (2013.01); *H02J 7/025* (2013.01); *Y02T 10/7005* (2013.01); *Y02T 90/122* (2013.01); *Y02T 90/14* (2013.01)

(58) Field of Classification Search
CPC ........... H02J 17/20; H02J 5/005; H02J 7/025; Y02T 90/14; Y02T 90/122; Y02T 10/7005; B60L 11/182
USPC .......................................................... 307/104
See application file for complete search history.

(56) References Cited

U.S. PATENT DOCUMENTS

| | | |
|---|---|---|
| 2008/0278264 A1 | 11/2008 | Karalis et al. |
| 2009/0174263 A1 | 7/2009 | Baarman et al. |
| 2010/0033156 A1* | 2/2010 | Abe et al. ...................... 323/305 |

(Continued)

FOREIGN PATENT DOCUMENTS

| | | |
|---|---|---|
| EP | 2 787 603 A1 | 10/2014 |
| JP | 2002-152997 A | 5/2002 |

(Continued)

OTHER PUBLICATIONS

International Search Report for corresponding International Application No. PCT/JP2012/007619 mailed Mar. 5, 2013.

(Continued)

*Primary Examiner* — Rexford Barnie
*Assistant Examiner* — Toan Vu
(74) *Attorney, Agent, or Firm* — Renner, Otto, Boisselle & Sklar, LLP

(57) ABSTRACT

A wireless electric power transmission apparatus as an embodiment of the present disclosure includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; an oscillator which is connected to one of the two antennas that transmits RF power; and a control section which controls a transmission frequency according to the magnitude of the electric power to be transmitted from one of the two antennas to the other. If a coupling coefficient between the two antennas is k, then fs and fp are set so as to satisfy the inequality $fs/fp < -0.6074 \times k^2 + 0.0466 \times k + 0.9955$.

14 Claims, 25 Drawing Sheets

(51) Int. Cl.
  *H02J 5/00* (2006.01)
  *H02J 7/02* (2006.01)

(56) References Cited

U.S. PATENT DOCUMENTS

2010/0219696 A1  9/2010  Kojima
2011/0037322 A1  2/2011  Kanno
2012/0274149 A1  11/2012  Kanno et al.
2012/0326499 A1  12/2012  Ichikawa et al.

FOREIGN PATENT DOCUMENTS

JP  2010-136464 A  6/2010
JP  2011-041464 A  2/2011
JP  2011-147213 A  7/2011
WO  WO 2011/019088 A2  2/2011
WO  2012/147339 A1  11/2012

OTHER PUBLICATIONS

Form PCT/ISA/237 for corresponding International Application No. PCT/JP2012/007619 dated Mar. 5, 2013.
Co-pending U.S. Appl. No. 13/686,076, filed Nov. 27, 2012.
Co-pending U.S. Appl. No. 13/686,242, filed Nov. 27, 2012.
Extended European Search Report for corresponding European Application No. 12852692.8 dated Oct. 8, 2015.

* cited by examiner

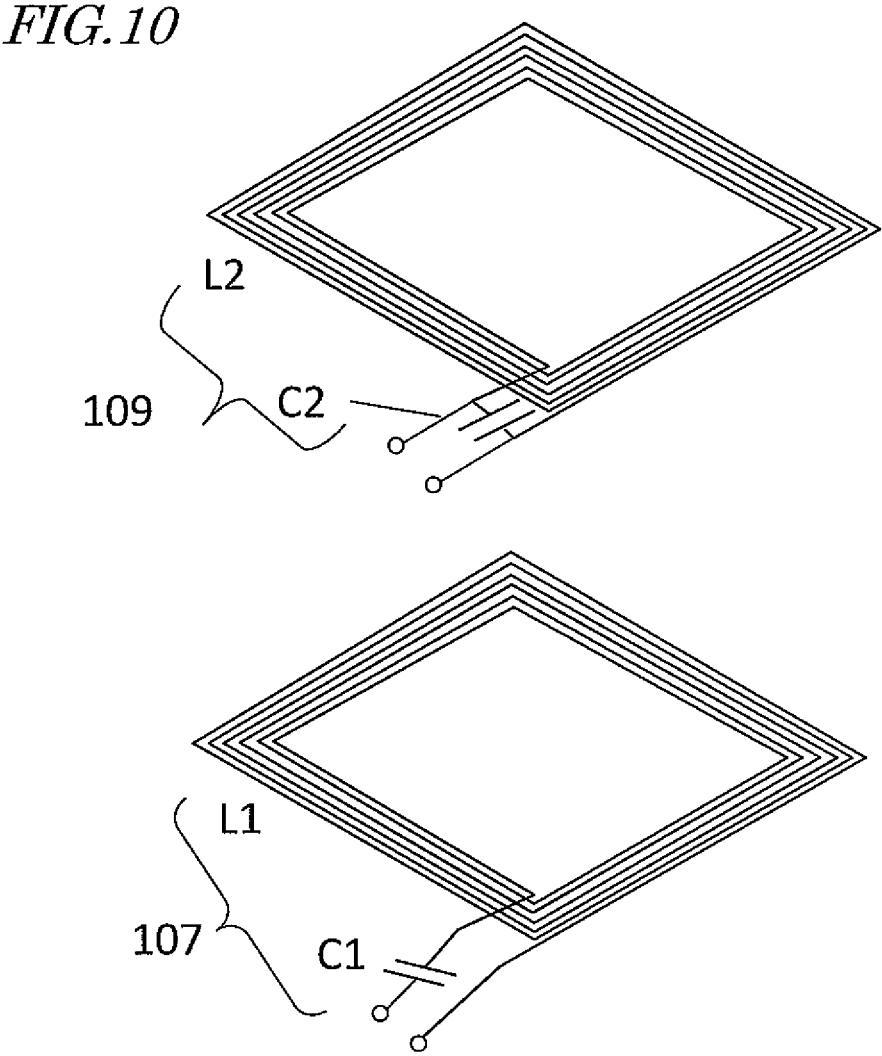

*FIG.13A* K=0.3
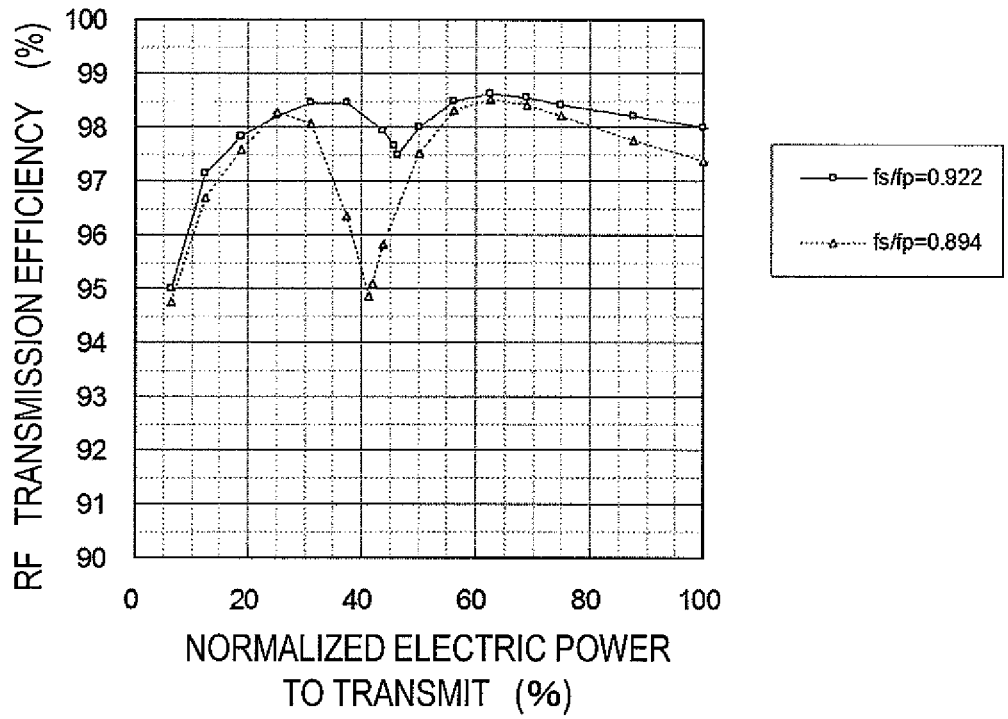
*FIG.13B* K=0.3
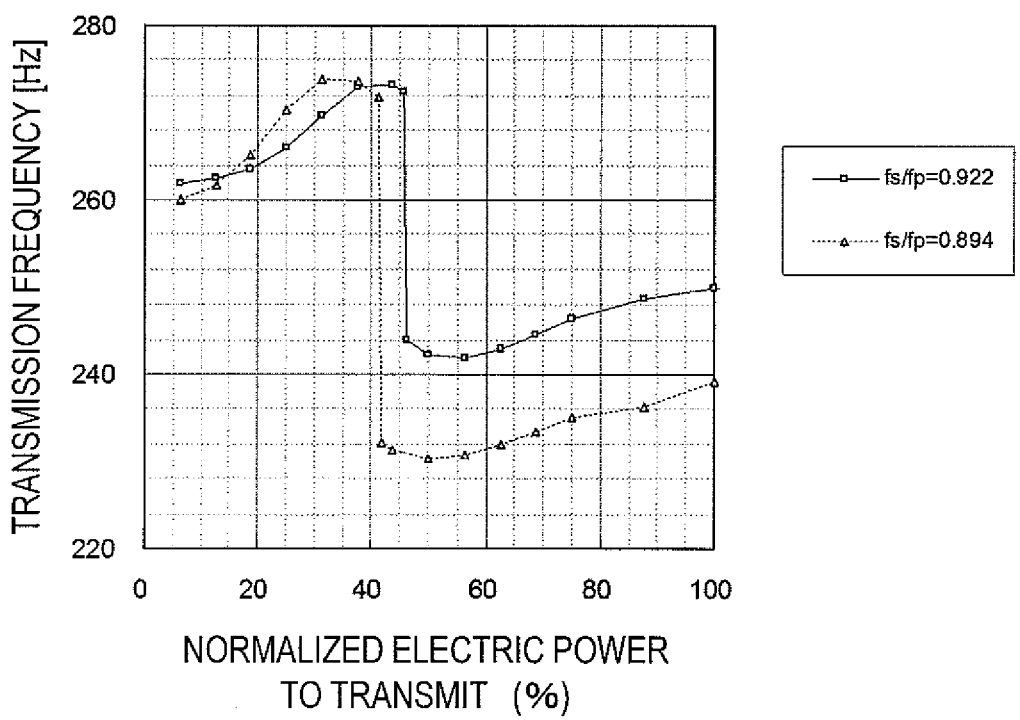

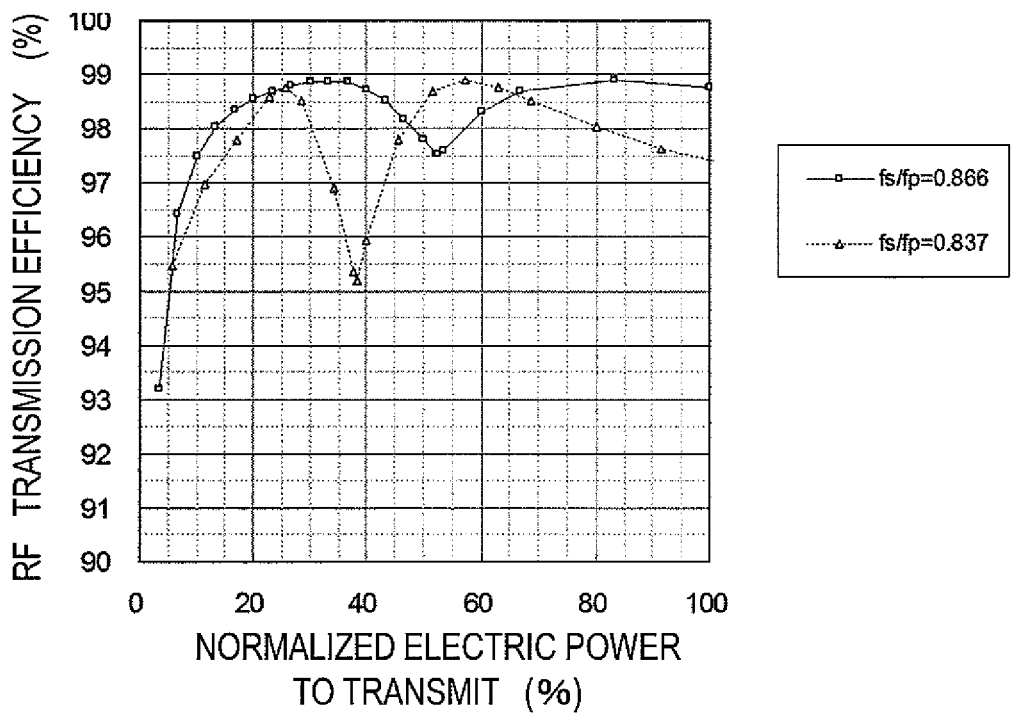
FIG.14A  K=0.4
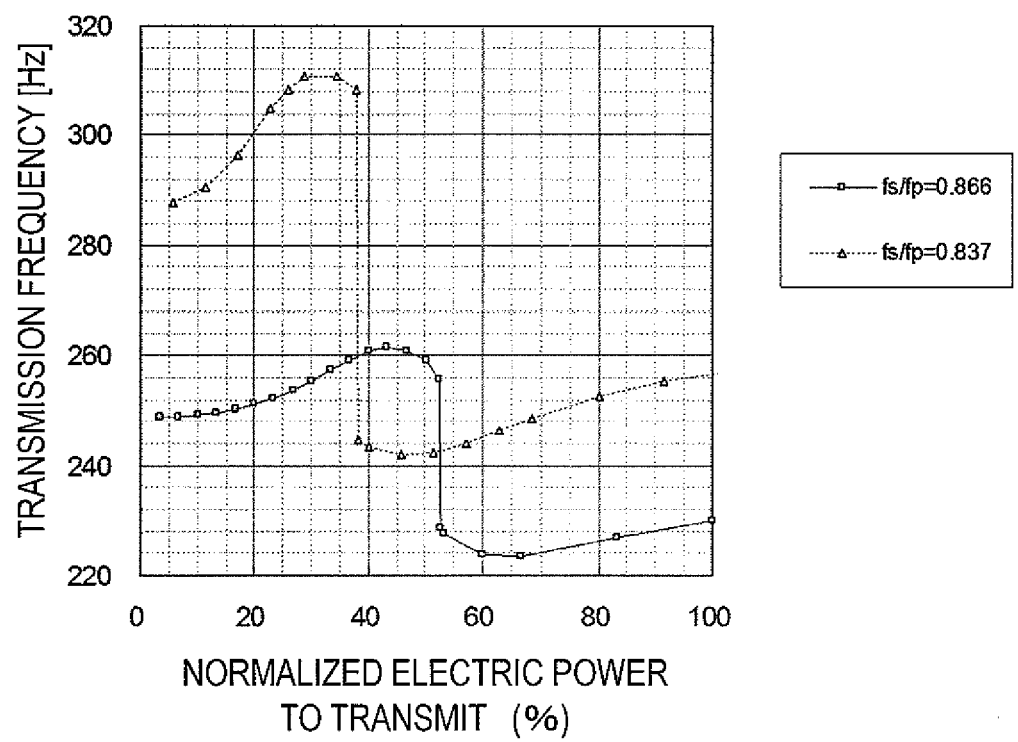
FIG.14B  K=0.4

WIRELESS ELECTRIC POWER TRANSMISSION APPARATUS

This application claims priority under 35 USC §119(e) to U.S. Provisional Application No. 61/564,370 filed on Nov. 29, 2011, the entire contents of which are incorporated herein by reference.

BACKGROUND

1. Technical Field

The present disclosure relates to a resonant magnetic coupling type non-contact power transmission technology for transmitting electric power wirelessly using resonant magnetic coupling.

2. Description of the Related Art

United States Patent Application Publication No. 2008/0278264 (FIGS. 12 and 14) discloses a new type of wireless energy transfer system for transferring energy wirelessly (through a space) from one of two resonators to the other, and vice versa. That wireless energy transfer system couples those two resonators with each other via the evanescent tail of the oscillation energy of the resonant frequency that is produced in the space surrounding those two resonators, thereby transferring the oscillation energy wirelessly (i.e., by a non-contact method).

Meanwhile, the traditional electromagnetic induction technology is still used today. Many of electronic devices, to which these electric power transmission technologies are applied, often demand supply of a constant voltage after having received electric power with a constant voltage and gone through some kind of power conversion, voltage division, energy transfer and other blocks. For example, as for an audiovisual device such as a TV set, such a device usually receives electric power through an AC outlet that supplies AC power with a substantially constant voltage and individual circuits in the device, which eventually consume the power supplied, operate with a predetermined voltage maintained. Even if the brightness on the screen has varied, such a variation can also be coped with by changing the amount of current to flow. Such an operation of receiving electric power with a constant voltage from a power supply and outputting the power with the constant voltage to a load will be referred to herein as a "constant voltage operation".

SUMMARY

The prior art technique needs further improvement in view of maintaining high-efficiency transmission performance when the system needs to perform a constant voltage operation, no matter whether the power to be transmitted is large or small.

One non-limiting, and exemplary embodiment provides a wireless power transmission system that can output power with a predetermined output voltage in response to power received with a predetermined input voltage and that can maintain high efficiency not just when transmitting a huge amount of power but also when transmitting only a small amount of power as well.

In one general aspect, a wireless electric power transmission apparatus as an embodiment of the present disclosure includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; an oscillator which is connected to one of the two antennas that transmits RF power; and a control section which controls a transmission frequency according to the magnitude of the electric power to be transmitted from one of the two antennas to the other. If a coupling coefficient between the two antennas is k, then fs and fp are set so as to satisfy the inequality $fs/fp < -0.6074 \times k^2 + 0.0466 \times k + 0.9955$.

While transmitting electric power between two antennas via resonant magnetic coupling, a wireless electric power transmission apparatus as an embodiment of the present disclosure can maintain high efficiency in a broad electric power transmission range.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 10 is a perspective view illustrating exemplary configurations for a power transmitting antenna and a power receiving antenna.

FIG. 13A is a graph showing how the transmission efficiency changes with the electric power to transmit in a situation where k=0.3.

FIG. 13B is a graph showing how the transmission frequency needs to change with the electric power to transmit to achieve the transmission efficiency shown in FIG. 13A.

FIG. 14A is a graph showing how the transmission efficiency changes with the electric power to transmit in a situation where k=0.4.

FIG. 14B is a graph showing how the transmission frequency needs to change with the electric power to transmit to achieve the transmission efficiency shown in FIG. 14A.

DETAILED DESCRIPTION

Figure 1:
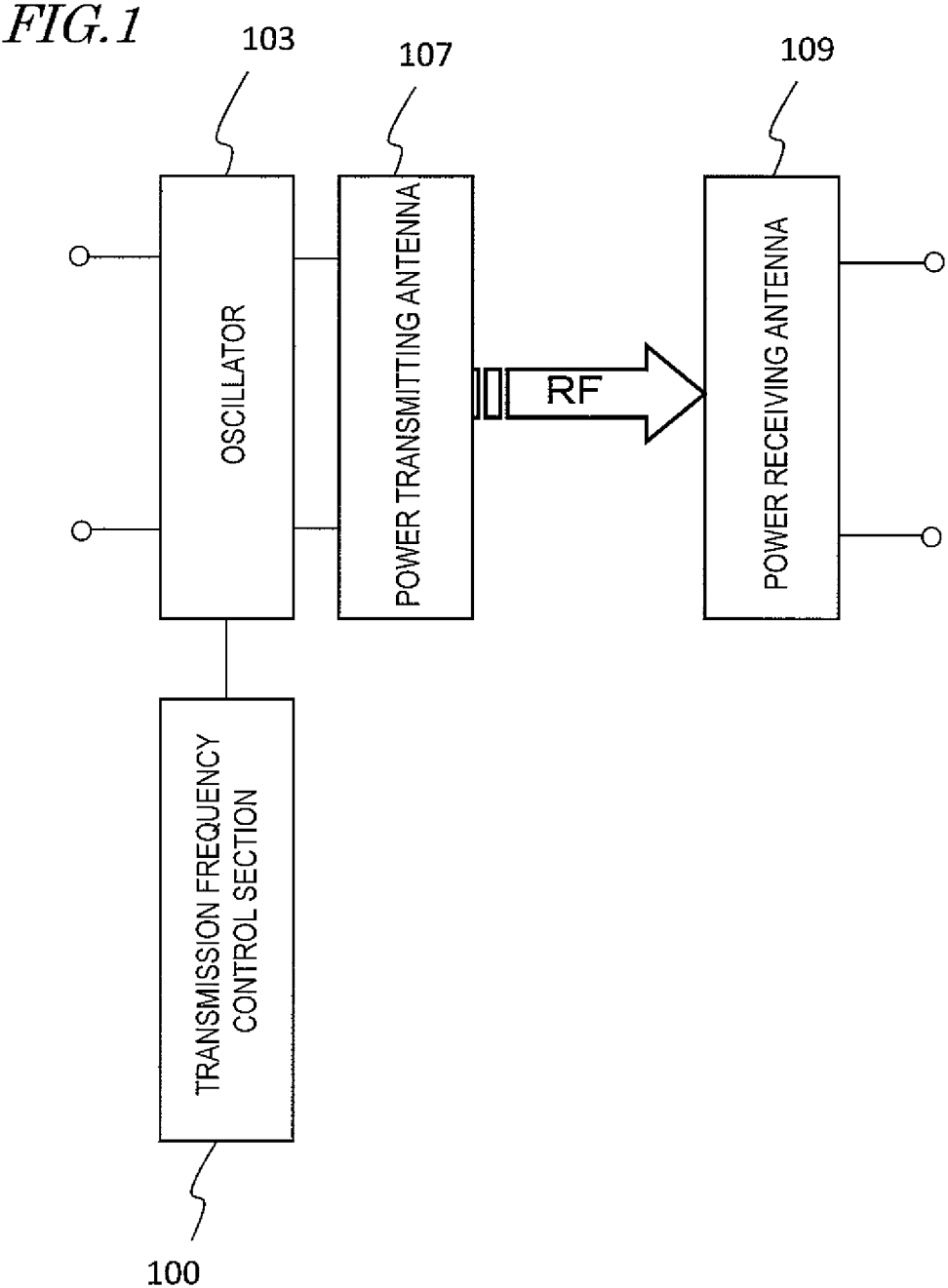
FIG. 1 illustrates an exemplary basic configuration for a wireless electric power transmission apparatus as an embodiment of the present disclosure.

The present inventors found that it is difficult for the wireless energy transfer system disclosed in United States Patent Application Publication No. 2008/0278264 to always maintain a high efficiency transfer characteristic in performing such a constant voltage operation all the time, no matter whether the power to be transmitted is large or small.

An exemplary embodiment of the present disclosure provides a wireless electric power transmission apparatus that can always maintain sufficiently high efficiency, not just when the power to transmit is big but also when only a little power needs to be transmitted.

In one general aspect, a wireless electric power transmission apparatus as an embodiment of the present disclosure includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; an oscillator which is connected to one of the two antennas that transmits RF power; and a control section which controls a transmission frequency according to the magnitude of the electric power to be transmitted from one of the two antennas to the other. If a coupling coefficient between the two antennas is k, then fs and fp are set so as to satisfy the inequality $fs/fp < -0.6074 \times k^2 + 0.0466 \times k + 0.9955$.

In one embodiment, the control section sets the transmission frequency to be a value that falls within a first frequency range if the electric power is greater than a reference value P1 but sets the transmission frequency to be a value that falls within a second frequency range, which is higher than the first frequency range, if the electric power is smaller than the reference value P1.

In another embodiment, if the electric power has changed from a value that is greater than the reference value P1 into a value that is smaller than the reference value P1 or if the electric power has changed from a value that is smaller than the reference value P1 into a value that is greater than the reference value P1, then the control section makes the transmission frequency hop between a value falling within the first frequency range and a value falling within the second frequency range.

In another embodiment, in making the transmission frequency hop, the control section changes the modes of a resonant magnetic field, which couples the two antennas together, from an even mode into an odd mode, and vice versa.

In another embodiment, the coupling coefficient k between the two antennas is kept constant while the electric power is being transmitted.

In another embodiment, the reference value P1 is set to be within the range of 60% to 80% of a maximum electric power to transmit Pmax.

In another embodiment, when one of the two antennas that is located on a receiving end has its output terminal connected to a load that follows the antenna, the output impedance Zoc of the oscillator that supplies RF energy to the other antenna on a transmitting end is equal to the input impedance Zin of the power transmitting antenna.

In another embodiment, when one of the two antennas that is located on the transmitting end has its input terminal connected to an output terminal of the oscillator, the output impedance Zout of the other antenna on the receiving end is equal to the input impedance of a load that is connected to the output of the antenna on the receiving end.

In another embodiment, the control section estimates whether transmission efficiency increases or decreases as the transmission frequency rises or falls with respect to at least one value of the electric power to transmit and determines a control pattern for the transmission frequency based on the result of the estimation.

In another embodiment, the two antennas have a resonant frequency adjustment function to change at least one of fs and fp, and the control section changes the fs/fp value after the wireless electric power transmission apparatus has been installed.

In another embodiment, after the wireless electric power transmission apparatus has been installed, the control section transmits electric power wirelessly with fs/fp set to be multiple different values, measures transmission efficiency, and then determines an fs/fp value for a normal operation based on the transmission efficiency.

In another aspect, a power transmitting device for use in the wireless electric power transmission apparatus disclosed herein includes: one of the two antennas configured to transmit RF power; and an oscillator that is connected to the antenna.

In another aspect, a power receiving device for use in the wireless electric power transmission apparatus disclosed herein includes one of the two antennas configured to receive RF power.

In another aspect, a controller for use in the wireless electric power transmission apparatus disclosed herein is configured to control the resonant frequency according to the magnitude of the electric power to be transmitted from one of the two antennas to the other.

Hereinafter, embodiments of the present disclosure will be described more concretely.

As shown in FIG. 1, a wireless electric power transmission apparatus as an embodiment of the present disclosure includes two antennas (namely, a power transmitting antenna 107 and a power receiving antenna 109), from one of which RF power can be transmitted to the other by a non-contact method via resonant magnetic coupling, and an oscillator 103 which is connected to the power transmitting antenna 107 on the RF power transmitting end. One of the power transmitting antenna 107 and the power receiving antenna 109 is a series resonant circuit, of which the resonant frequency is fs, and the other is a parallel resonant circuit, of which the resonant frequency is fp. The power receiving antenna 109 is not in contact with the power transmitting antenna 107 but is located at a distance of about several millimeters to about several ten centimeters from the power transmitting antenna 107, for example.

This wireless electric power transmission apparatus further includes a control section (which will be referred to herein as a "transmission frequency control section") 100 which controls the frequency of the RF power (i.e., the transmission frequency) to be transmitted from one of the two antennas 107 and 109 to the other. The transmission frequency control section 100 is configured to adjust the transmission frequency according to the magnitude of the RF power (which will be referred to herein as "electric power to transmit") to be transmitted from one of the two antennas 107 and 109 to the other. The transmission frequency may be set to fall within the range of 50 Hz to 300 GHz. The transmission frequency suitably falls within the range of 20 kHz to 10 GHz, more suitably within the range of 20 kHz to 20 MHz, and even more suitably within the range of 20 kHz to 1 MHz. In one embodiment, the transmission frequency is set to be 6.78 MHz.

The oscillator 103 receives DC or AC energy (electric power) that is supplied from a power supply (not shown), and performs frequency conversion (which may be either DC/RF conversion or AC/RF conversion) on the supplied energy, thereby turning it into RF energy with the transmission frequency. The oscillator 103 is connected to the transmission frequency control section 100 and gets the transmission frequency changed by the transmission frequency control section 100. The RF energy output from the oscillator 103 is supplied to the power transmitting antenna 107. In transmitting the electric power, the power transmitting antenna 107 and the power receiving antenna 109 are magnetically coupled together via a resonant magnetic field that is produced by their resonators in the surrounding space. The output section of the power receiving antenna 109 is connected to a load. Optionally, a frequency converter may be connected to the output section of the power receiving antenna 109.

In the wireless electric power transmission apparatus according to this embodiment of the present disclosure, the "antenna" is not an ordinary antenna for transmitting or receiving an electromagnetic field radiated but an element for transferring energy from one of two objects to the other, and vice versa, by using a coupling phenomenon that has been produced by the evanescent tail of the magnetic field of the resonator. According to such a wireless electric power transmission technique that uses the resonant magnetic field, energy loss (radiation loss), which would otherwise be caused when an electromagnetic wave is transferred to a distant location, will not be caused, and therefore, the electric power can be transmitted with very high efficiency. Such an energy transfer technique that uses the coupling phenomenon of a resonant electromagnetic field (i.e., a near field) will cause much less loss than a known wireless electric power transmission that uses the Faraday's law of electromagnetic induction. Rather, energy can be transmitted efficiently between two resonators (or antennas), which have an interval of as long as several meters between them.

To carry out a wireless electric power transmission based on such a principle, coupling needs to be produced between two resonant antennas. fs and/or fp do not have to be exactly equal to the transmission frequency. In an embodiment of the present disclosure, fs is set to be smaller than fp and the transmission frequency is changed according to the electric power to transmit.

Figure 2:
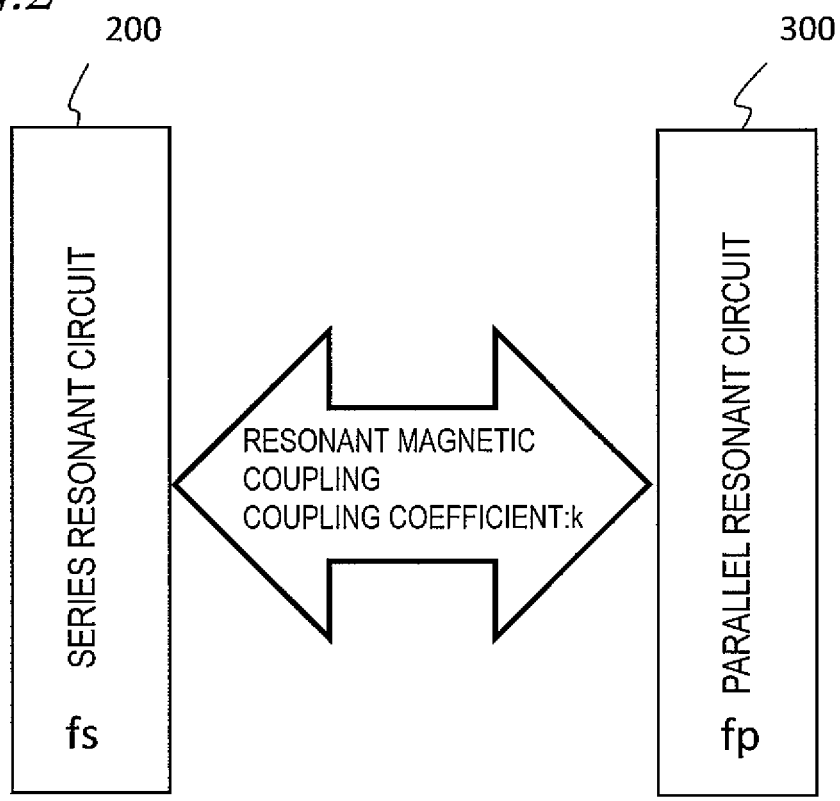
FIG. 2 schematically illustrates how two resonant circuits are coupled together in a wireless electric power transmission apparatus as an embodiment of the present disclosure.

FIG. 2 schematically illustrates how resonant magnetic coupling is produced at a coupling coefficient k between a series resonant circuit 200 with a resonant frequency fs and a parallel resonant circuit 300 with a resonant frequency fp.

In general, it is known that when two resonators that have their own resonant frequencies are electrically coupled together, those resonant frequencies will change. Even if the resonant frequencies of the two resonators are the same, the resonant frequency of the pair of resonators splits into two frequencies as a result of the coupling. Of the two resonant frequencies of the pair of resonators that are coupled together, the higher one will be referred to herein as an "even-mode resonant frequency fH" and the lower one as an "odd-mode resonant frequency fL", respectively. In this case, the coupling coefficient k between the resonators is represented by the following Equation (1):

$$k=(fH^2-fL^2)\div(fH^2+fL^2) \qquad (1)$$

In this case, the stronger the degree of coupling, the greater the k value and the bigger the difference between the two resonant frequencies that have split. In an embodiment of the present disclosure, k is set to be a relatively small value, e.g., within the range $0<k\leq0.5$, more suitably within the range $0.1\leq k\leq0.5$. The k value could be greater than 0.5. However, by setting the k value to be equal to or smaller than 0.5, various effects unique to the resonant magnetic coupling method, including an increased distance between the power transmitting and receiving antennas and asymmetry in size between the power transmitting and receiving antennas, can be achieved significantly.

Figure 3A:
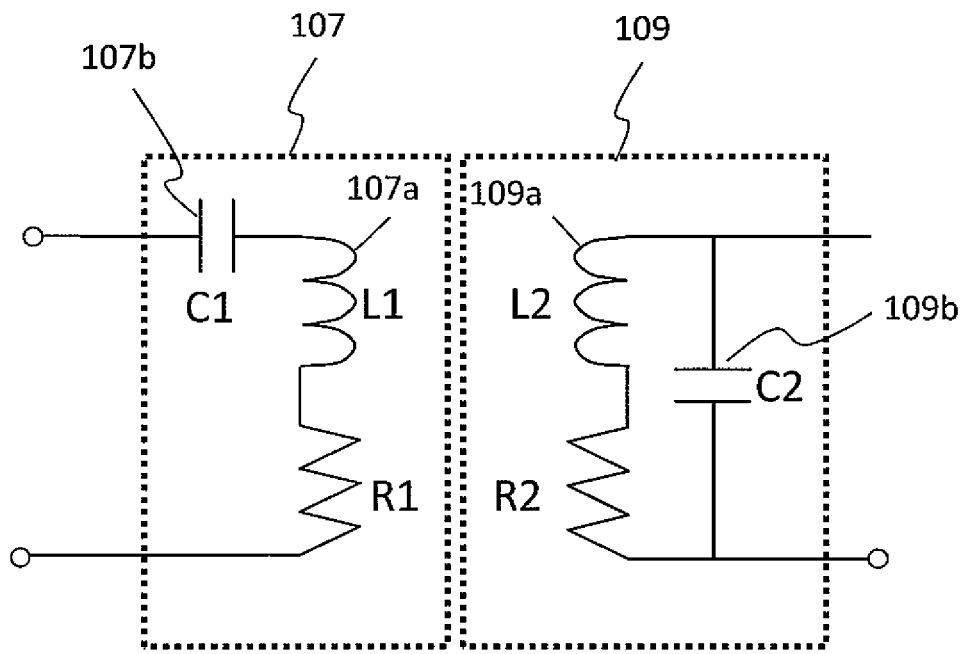
FIG. 3A illustrates an exemplary equivalent circuit for a pair of antennas for use in a wireless electric power transmission apparatus as an embodiment of the present disclosure.
Figure 3B:
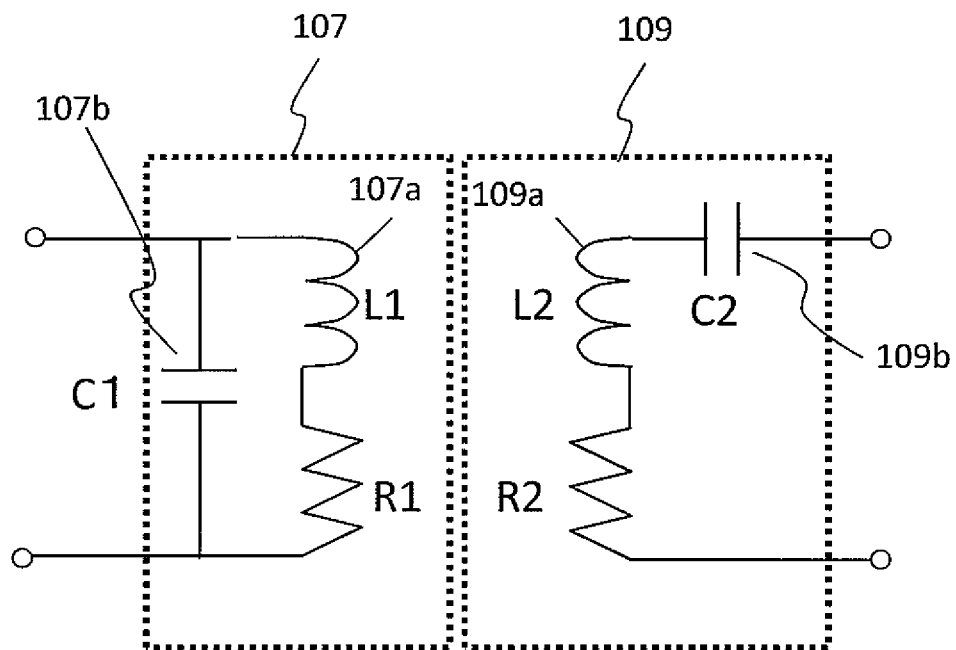
FIG. 3B illustrates another exemplary equivalent circuit for a pair of antennas for use in a wireless electric power transmission apparatus as an embodiment of the present disclosure.

FIG. 3A is an equivalent circuit diagram illustrating a configuration in which the power transmitting antenna 107 is implemented as a series resonant circuit and the power receiving antenna 109 is implemented as a parallel resonant circuit. In the exemplary configuration shown in FIG. 3A, the power transmitting antenna 107 is a series resonant circuit in which a first inductor 107a and a first capacitor 107b are connected together in series, while the power receiving antenna 109 is a parallel resonant circuit in which a second inductor 109a and a second capacitor 109b are connected together in parallel. The series resonant circuit of the power transmitting antenna 107 has a parasitic resistance component R1 and the parallel resonant circuit of the power receiving antenna 109 has a parasitic resistance component R2. In an embodiment of a wireless electric power transmission apparatus according to the present disclosure, the power transmitting antenna 107 and the power receiving antenna 109 are implemented as an asymmetric combination consisting of a series resonant circuit and a parallel resonant circuit. In an alternative embodiment of the present disclosure, the power transmitting antenna 107 may be implemented as a parallel resonant circuit and the power receiving antenna 109 may be implemented as a series resonant circuit as shown in FIG. 3B. By setting the k value to be equal to or smaller than 0.5 and by implementing the power transmitting antenna and the power receiving antenna as a series resonant circuit and a parallel resonant circuit, respectively, the effect of increasing the voltage received after the electric power has been transmitted can be achieved significantly. On the other hand, by setting the k value to be equal to or smaller than 0.5 and by implementing the power transmitting antenna and the power receiving antenna as a parallel resonant circuit and a series resonant circuit, respectively, the effect of decreasing the voltage received after the electric power has been transmitted can also be achieved significantly.

Figure 4A:
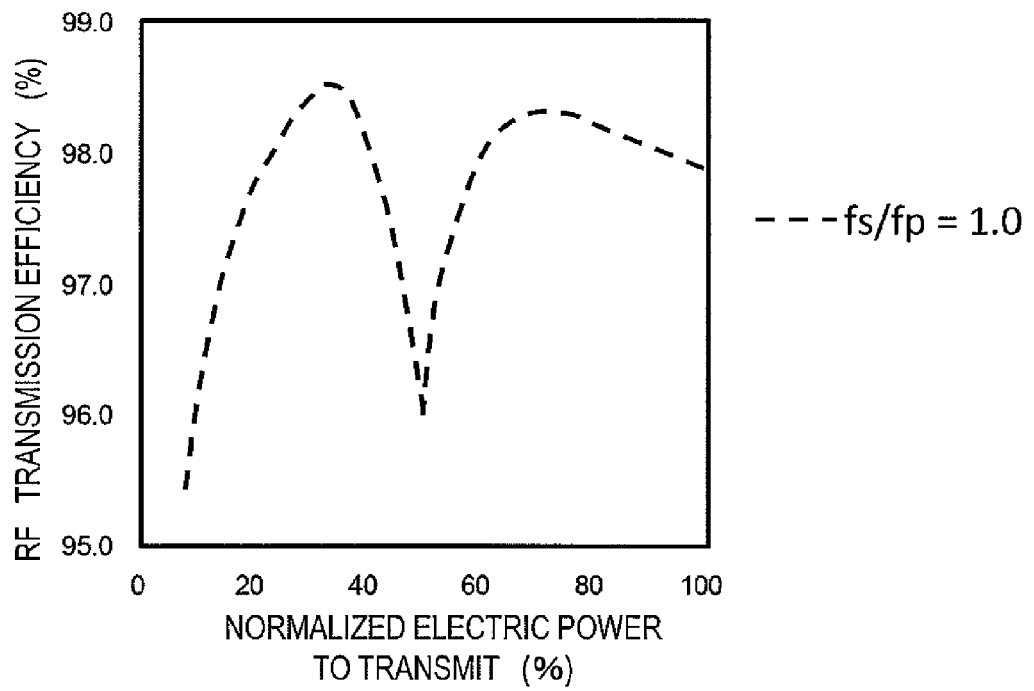
FIG. 4A is a graph showing how the transmission efficiency changes with the electric power to transmit when fs/fp=1.0.

In this description, the ratio fs/fp of the resonant frequency fs of a series resonant circuit to the resonant frequency fp of a parallel resonant circuit will be referred to herein as a "resonant frequency ratio". The present inventors discovered that when the resonant frequency ratio fs/fp was set to be equal to 1.0, the transmission efficiency decreased with the electric power to transmit, which is a problem. FIG. 4A is a graph illustrating such a problem. That is to say, this graph shows how the transmission efficiency changes with the electric power to transmit in a situation where fs/fp=1.0. In the graph shown in FIG. 4A, the abscissa represents the electric power to transmit that is normalized with a certain value of the electric power to transmit (which will be referred to herein as "normalized electric power to transmit" (of which the unit is %)). Although any value may be used for the normalization, the maximum value of the electric power to transmit may be used, for example. In this description, this "normalized electric power to transmit" will be sometimes simply referred to herein as "electric power to transmit". In the example illustrated in FIG. 4A, when the electric power to transmit is approximately 50%, a steep decrease in transmission efficiency is observed. Such a steep drop in transmission efficiency will be referred to herein as "Dip". The present inventors discovered that if the fs/fp ratio was set to be the best value that had been determined according to the coupling coefficient k, the magnitude of such a decrease in transmission efficiency due to a variation in the electric power to transmit could be reduced. The present inventors also discovered that even if the fs/fp ratio was set to be less than the best value that had been determined according to the coupling coefficient k but if the transmission frequency was changed appropriately according to the electric power to transmit, such a decrease in transmission efficiency could still be minimized, thus perfecting our invention.

Figure 4B:
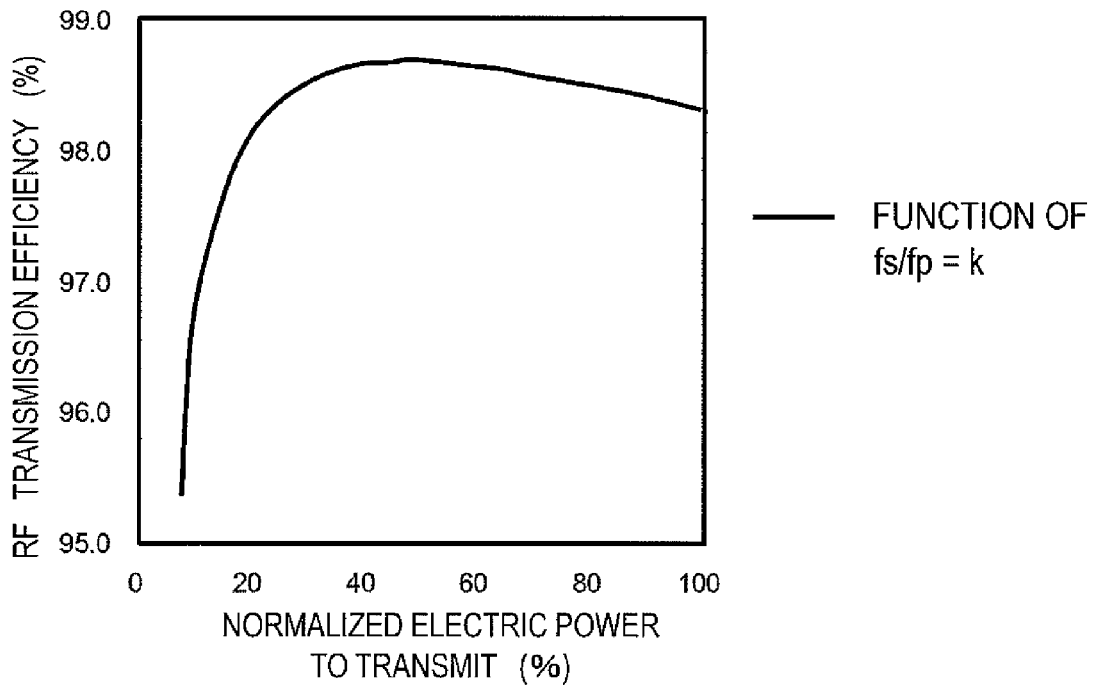
FIG. 4B is a graph showing how the transmission efficiency changes with the electric power to transmit in a wireless electric power transmission apparatus in which the fs/fp ratio is set to be the best value (which is a function of k) to be determined by the coupling coefficient k.

FIG. 4B is a graph showing how the transmission efficiency changes with the electric power to transmit in a wireless electric power transmission apparatus in which the fs/fp ratio is set to be the best value that is determined by the coupling coefficient k (which is a function of k). In the example shown in FIG. 4B, the transmission frequency is set to be a constant value irrespective of the electric power to transmit. Comparing the solid curve shown in FIG. 4B to the dashed curve shown in FIG. 4A, it can be seen easily that by setting the fs/fp ratio to be the best value that is determined by the coupling coefficient k, the decrease in transmission efficiency due to a variation in electric power to transmit can be minimized. However, the present inventors also discovered that even if the fs/fp ratio disagreed with the best value that had been determined by the coupling coefficient k (i.e., as a function of k), the decrease in transmission efficiency could still be minimized by adjusting the transmission frequency according to the electric power to transmit.

Hereinafter, the relation between the fs/fp ratio and the coupling coefficient will be described.

Figure 5:
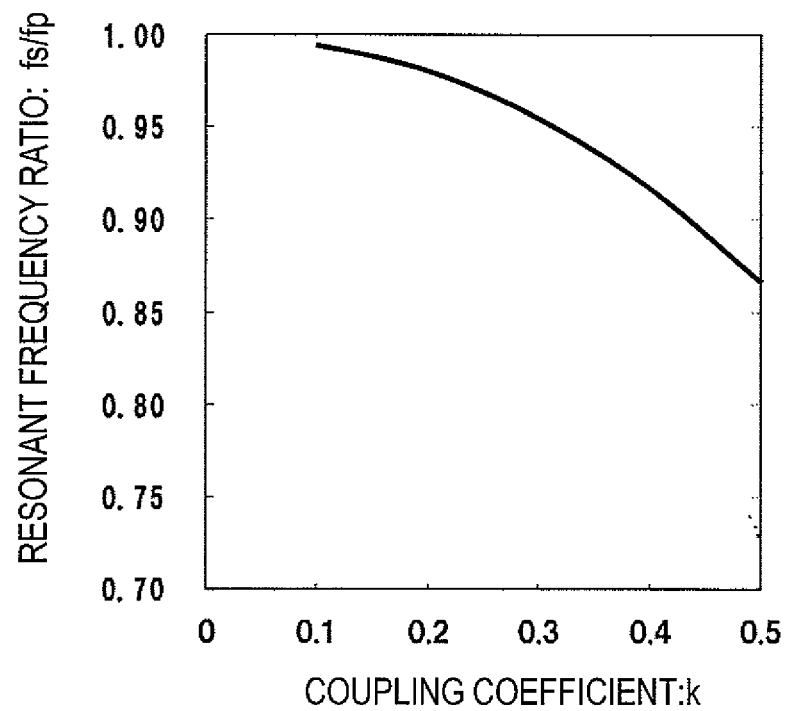
FIG. 5 is a graph showing how the best fs/fp ratio changes with the coupling coefficient k.

First of all, look at FIG. 5, which is a graph showing how the resonant frequency ratio fs/fp (represented by the ordinate) changes with the coupling coefficient k (represented by the abscissa). In FIG. 5, the solid curve represents a quadratic equation given by the following Equation (2):

$$fs/fp = F(k) = -0.6074 \times k^2 + 0.0466 \times k + 0.9955 \qquad (2)$$

This Equation (2) represents the best fs/fp ratio when a coupling coefficient k is given. In this case, the fs/fp ratio is called the "best" because if the fs/fp ratio is varied, then the local decrease in transmission efficiency such as the one shown in FIG. 4A can be minimized. It does not mean that even if the fs/fp ratio is the best one, the local decrease in transmission efficiency can be eliminated altogether.

Figure 6:
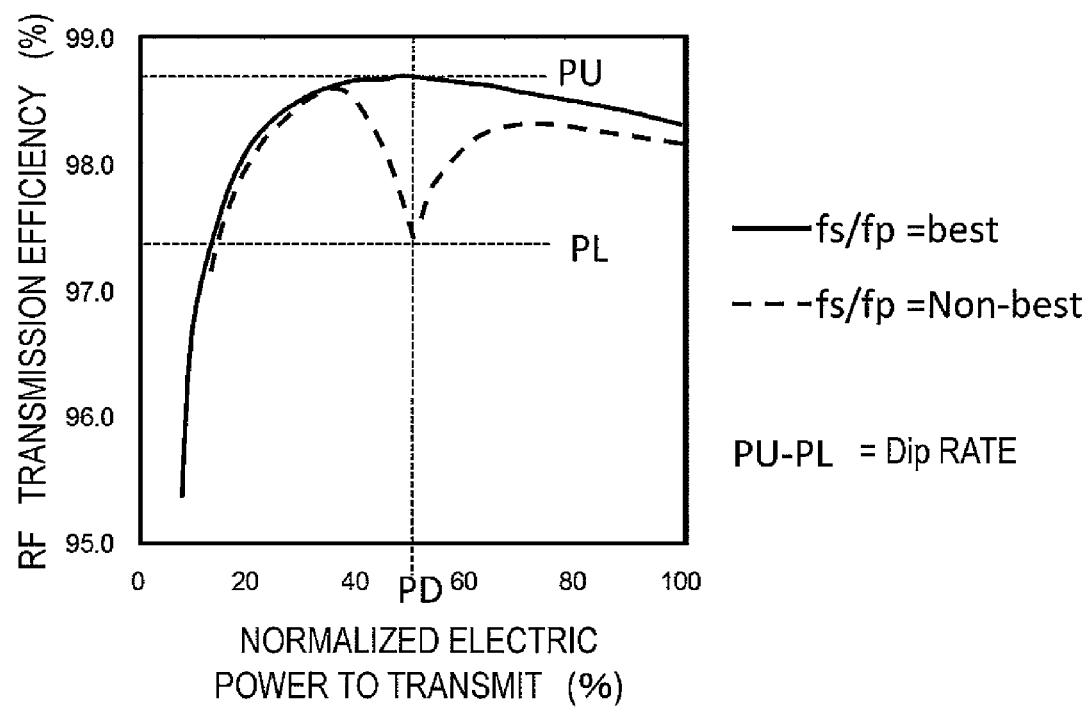
FIG. 6 is a graph showing what the "Dip rate" means.

In this description, in order to estimate the degree of decrease in transmission efficiency, a value called "Dip rate" is introduced. FIG. 6 is a graph showing what the "Dip rate" means. In FIG. 6, the dashed curve shown in FIG. 4A and the solid curve shown in FIG. 4B are both shown. As for the curve with the Dip portion in which the transmission efficiency decreases locally, the electric power to transmit, at which the transmission efficiency becomes a local minimum, is identified by PD and the transmission efficiency at the electric power to transmit PD is identified by PL. On the other hand, as for the curve in which the fs/fp ratio is adjusted to be the best one, the transmission efficiency at the electric power to transmit PD is identified by PU. In this case, the Dip rate is obtained by calculating PU-PL. The best Dip rate is 0% but the actual Dip rate does not always have to be 0%. In an embodiment of the present disclosure, the fs/fp value is set to be smaller than the reference value defined by Equation (2) and the transmission frequency is changed according to the electric power to transmit as will be described later. Even if the fs/fp ratio is smaller than F(k) of Equation (2), the Dip rate can still be reduced by appropriately adjusting the transmission frequency according to the electric power to transmit. In this case, the "magnitude of the given k" may refer herein to the "magnitude of k that has been set in advance during a design process" or the "magnitude of k that has been measured directly after the antennas have been installed", or the "magnitude of k that has been estimated by either measuring or monitoring a physical parameter that varies with k after the antennas have been installed".

In the example illustrated in FIG. 1, the transmission frequency control section 100 connected to the oscillator 103 controls the transmission frequency according to the magnitude of the electric power to transmit from one of the two antennas to the other. In this description, the concept of reference frequency f0 is introduced in order to make a variation in transmission frequency more easily understandable. In this case, the frequency f0 is a transmission frequency associated with the maximum electric power to transmit when fs/fp is optimized. As described above, according to this embodiment, the resonant frequencies fs and fp are set so that the fs/fp value is located under the curve shown in FIG. 5.

The transmission frequency control section 100 of this embodiment sets the transmission frequency to fall within a first frequency range, which is higher than the frequency f0, if the electric power to be transmitted from one of the two antennas 107 and 109 to the other is smaller than the reference value P1, but sets the transmission frequency to fall within a second frequency range, which is lower than the first frequency range, if the electric power to be transmitted is greater than the reference value P1. This reference value P1 is set to be smaller than the maximum electric power Pmax to transmit and is suitably set to fall within the range of 30-80% of the maximum electric power Pmax to transmit. By switching the modes of resonant magnetic coupling between the power transmitting and power receiving antennas, the transmission efficiency can be kept high.

Figure 7:
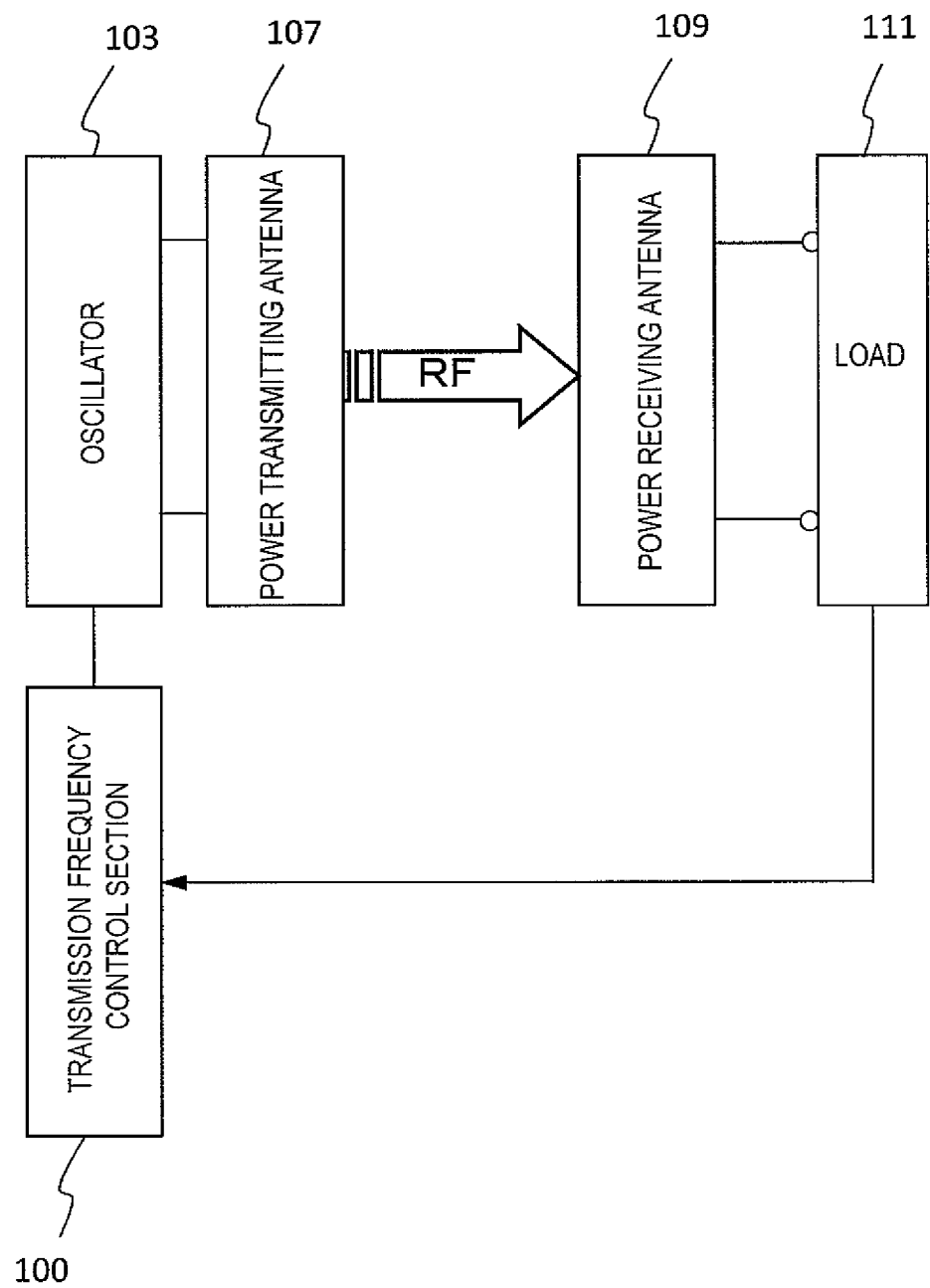
FIG. 7 is a block diagram illustrating an embodiment in which a load 111 and a transmission frequency control section 100 are further connected.

The transmission frequency control section 100 generates a signal to control the oscillation frequency of the oscillator 103 (such as a pulse train with a variable frequency) and supplies that signal to the oscillator 103. In this embodiment, the output of the power receiving antenna 109 is connected to a load 111 as shown in FIG. 7. Depending on the condition of (such as the power dissipated by) that load 111, the magnitude of the electric power to be transmitted from the power transmitting antenna 107 to the power receiving antenna 109 may vary. In the example illustrated in FIG. 7, either information or signal indicating the magnitude of the electric power to transmit that is required by the load 111 is supplied from the load 111 to the control section 100. In response, the control section 100 can increase or decrease the oscillation frequency of the oscillator 103. As a result, the transmission frequency is controlled.

Figure 8:
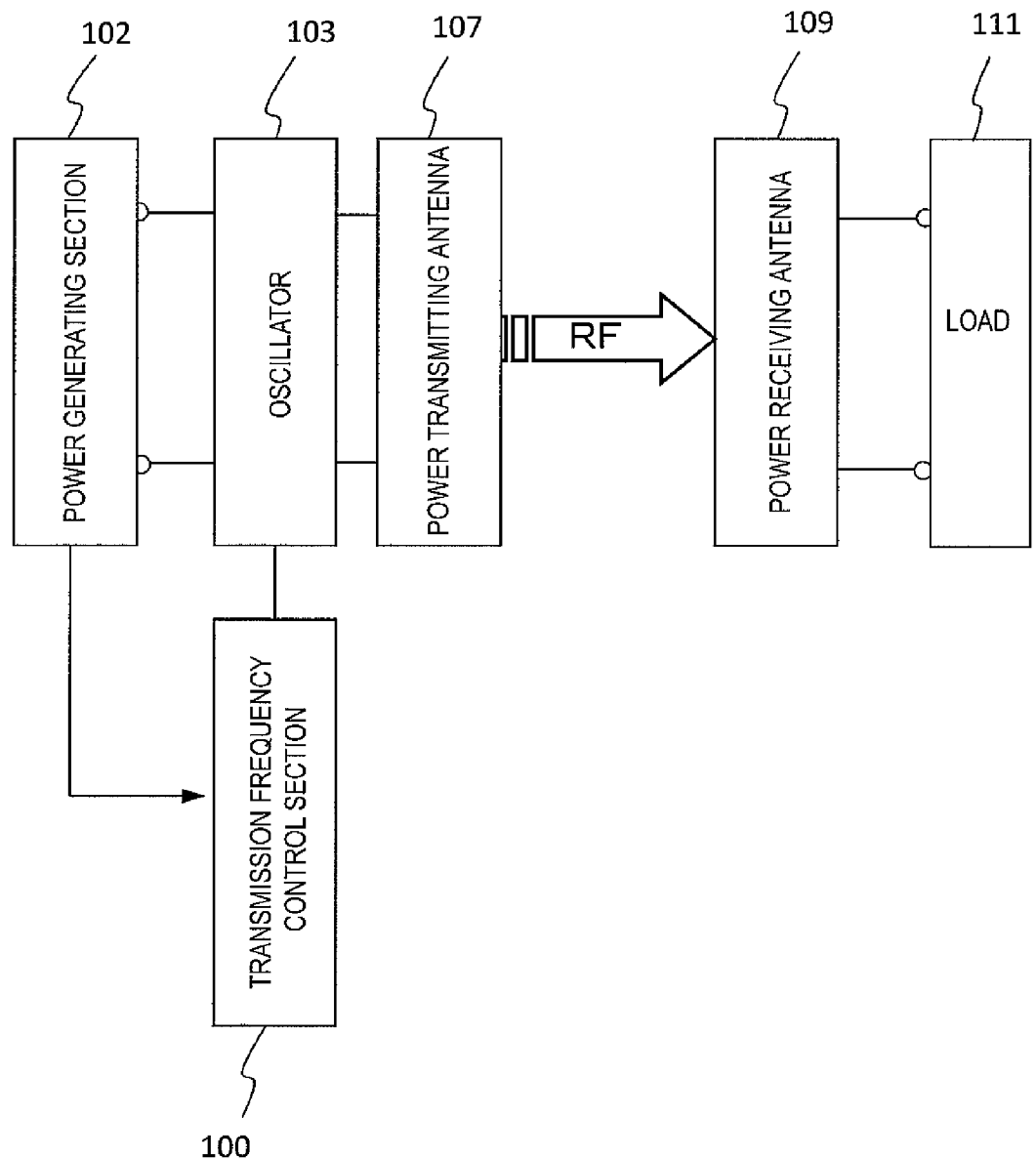
FIG. 8 is a block diagram illustrating an embodiment in which a power generating section 103 and a transmission frequency control section 100 are further connected.

In another embodiment of the present disclosure, the oscillator 103 may be connected to a power generating section 102 as shown in FIG. 8 and the frequency control section 100 can change the oscillation frequency of the oscillator 103 depending on the condition of the power generating section 102. The power generating section 102 includes a power generating module such as a solar cell. The electric power to be supplied from the power generating section 102 to the oscillator 103 may vary depending on the condition of the power generating section 102. For example, the electric power to generate may vary according to the quantity of the sunlight received by the solar cell. In that case, the magnitude of the electric power to be transmitted from the power transmitting antenna 107 to the power receiving antenna 109 may change, too. In the example illustrated in FIG. 8, either information or signal indicating the magnitude of the electric power to transmit (i.e., the electric power generated by the power generating section 102) is supplied from the power generating section 102 to the control section 100. In response, the transmission frequency control section 100 can increase or decrease the oscillation frequency of the oscillator 103. As a result, the transmission frequency is controlled.

As will be described later, the dependence of the transmission frequency on the electric power to transmit when the transmission frequency is changed according to the electric power to transmit so as to avoid decreasing the transmission efficiency may be determined in advance via experiment, for example, and may be stored in a memory that is provided for either the wireless electric power transmission apparatus or the load. Alternatively, the relation between the magnitude of the electric power to transmit and the transmission frequency may also be determined by the transmission efficiency while electric power is actually being transmitted. In general, the fs/fp value is set to be a predetermined value (designed value) while the power transmitting antenna 107 and the power receiving antenna 109 are being made. However, the actual fs/fp value could be different from the designed value. That is why after the wireless electric power transmission apparatus has been installed, the exact value of fs/fp could be unknown. In that case, after the wireless electric power transmission apparatus has been installed, electric power may be actually transmitted wirelessly and it may be determined what relation the electric power to transmit and the transmission frequency should have in order to decrease the Dip rate sufficiently.

Figure 9A:
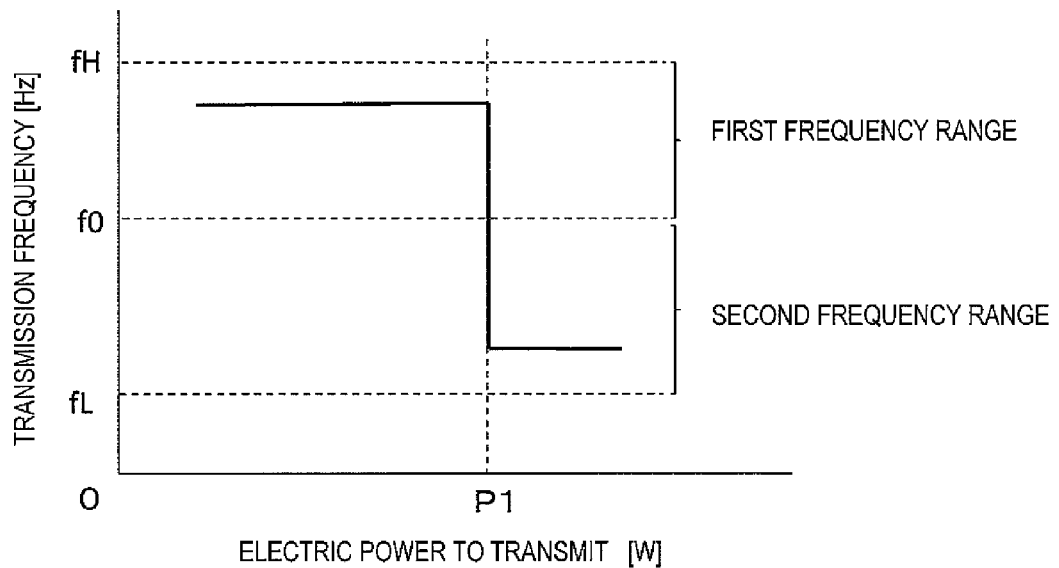
FIG. 9A is a graph showing an exemplary relation between the magnitude of the electric power to transmit and the transmission frequency in an embodiment of the present disclosure.

FIG. 9A is a graph showing an exemplary relation between the electric power to transmit and the transmission frequency. In the example shown in FIG. 9A, a frequency falling within the first frequency range is set to be higher than the frequency f0. In this example, the first frequency range is defined to be from over the frequency f0 through the even mode resonant frequency fH, while the second frequency range is defined to be from the odd mode resonant frequency fL through the frequency f0. The even- and odd-mode resonant frequencies fH and fL are just as described above.

Figure 9B:
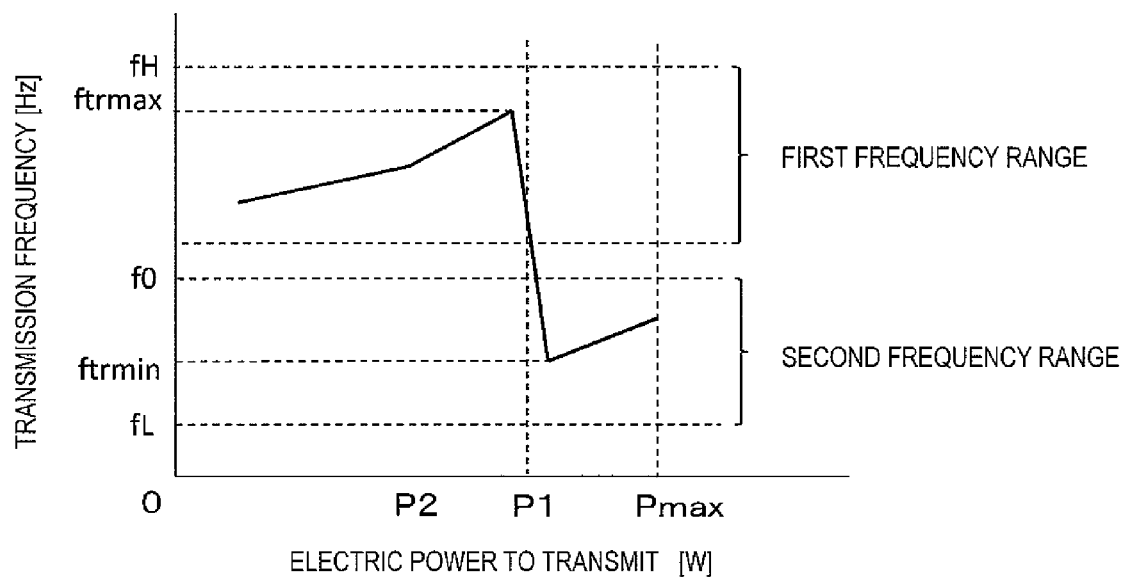
FIG. 9B is a graph showing another exemplary relation between the magnitude of the electric power to transmit and the transmission frequency in an embodiment of the present disclosure.

If the electric power to transmit has changed from a value that is greater than the reference value P1 into a value that is smaller than the reference value P1, or vice versa, then the control section 100 makes the transmission frequency hop from a value falling within the first frequency range to a value falling within the second frequency range, or vice versa. In making the transmission frequency hop, the control section 100 changes the modes of the resonant magnetic field that couples the two antennas together from the even mode into the odd mode, or vice versa. The relation between the electric power to transmit and the transmission frequency does not have to be as shown in FIG. 9A. FIG. 9B shows an example of a more complex relation. In this example, the transmission frequency has its maximum value between reference values P1 and P2, of which the values may vary according to the coupling coefficient k.

The relation between the magnitude of the electric power to transmit and the transmission frequency and the reference values P1 and P2 and other values can be obtained by determining a transmission frequency that will optimize the transmission efficiency under given electric power to transmit. A specific example of the relation between the magnitude of the electric power to transmit and the transmission frequency will be described in detail later. The coupling coefficient k between the two antennas can be kept constant while the electric power is being transmitted.

Naturally, a wireless electric power transmission apparatus should maintain high transmission efficiency under such an operating condition that turns the power P to transmit into a maximum one Pmax. However, the efficiency should also be kept high even under such a transmission condition for transmitting a reduced power. Furthermore, no matter whether the power to transmit satisfies P=Pmax or P≠Pmax, a constant voltage operation can be performed. That is why the following relations need to be satisfied between the input and output impedances Zin (P=Pmax), Zout (P=Pmax) when P=Pmax and the input and output impedances Zin and Zout when an arbitrary power P is transmitted:

$$Zin = Zin(P=Pmax) \times (Pmax \div P) \quad (4)$$

$$Zout = Zout(P=Pmax) \times (Pmax \div P) \quad (5)$$

That is to say, while a constant voltage operation is performed, the input and output impedances change inversely proportionally to the electric power to transmit. Under this condition, high transmission efficiency can be maintained in a broad transmission power range. To achieve this object, the transmission frequency ftr of a wireless electric power transmission apparatus according to an embodiment of the present disclosure is controlled so as to change, according to the magnitude of electric power to transmit, within a range that is higher than the frequency fL but lower than the frequency fH.

It should be noted that such a phenomenon happens only when the power transmitting and power receiving antennas are implemented as a combination of asymmetric resonant circuit structures such as a series resonant circuit and a parallel resonant circuit. That is to say, the effects of the present disclosure cannot be achieved if the power transmitting and power receiving antennas are implemented as a pair of series resonant circuits or a pair of parallel resonant circuits. Likewise, if the power transmitting and power receiving antennas both have a circuit configuration that is supplied with energy from an external circuit based on the principle of electromagnetic induction (which will be referred to herein as "circuits of electromagnetic induction power supply type"), the effects of the present disclosure cannot be achieved, either. Furthermore, even if the power transmitting and power receiving antennas are implemented as a pair of resonators in a hybrid combination such as a series resonant circuit and an electromagnetic induction power supply type circuit or a parallel resonant circuit and an electromagnetic induction power supply type circuit, the effects of the present disclosure cannot be achieved, either.

The P1 value may be set to be a power value that is approximately 30-80% as high as Pmax. However, the P1 value does not have to fall within this range but may also be out of the range depending on the situation.

The transmission frequency can be easily varied and controlled by adjusting the oscillation frequency of the oscillator 103.

It is recommended that while electric power is being transmitted, the coupling coefficient k between the power transmitting and power receiving antennas be kept substantially constant. This is because if the coupling coefficient k varied significantly while electric power is being transmitted, it would be difficult to achieve the constant-voltage operation with high efficiency.

As the oscillator 103, a class D, E or F amplifier that would realize high efficiency and low distortion may be used. Or a Doherty amplifier could also be used. Optionally, a sinusoidal wave may be produced with high efficiency by arranging a low-pass filter, a band-elimination filter, or a band-pass filter after a switching element (such as an inverter circuit) that generates an output signal with a distortion component. The oscillator 103 may even be a frequency converter that receives an AC input and delivers an output with a high frequency. In that case, the wireless transmission section may also function as a band-pass filter. In any case, the power that has been supplied to the oscillator is converted into RF energy. That RF energy is transmitted wirelessly through the space by the wireless transmission section and then output through the output terminal.

To reduce multiple reflection of the RF energy between the circuit blocks and to improve the overall transmission efficiency, when the output terminal of the power receiving antenna 109 is connected to a load, the output impedance Zoc of the RF energy of the oscillator 103 may be matched to the input impedance Zic of the power transmitting antenna 107. Likewise, when the oscillator 103 is connected to the power transmitting antenna 107, the output impedance Zout of the power receiving antenna may be matched to the resistance value R of the connected load.

In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

According to this embodiment, the efficiency of the wireless electric power transmission depends on the gap between the power transmitting and power receiving antennas 107 and 109 (which will be referred to herein as an "antenna-to-antenna gap") and on the magnitude of loss caused by circuit components that form the power transmitting and power receiving antennas 107 and 109. In this description, the "antenna-to-antenna gap" substantially means the gap between the two inductors 107a and 109a. The antenna-to-antenna gap can be estimated based on the feature size of the areas occupied by those antennas.

In one embodiment, the first and second inductors 107a and 109a both have the same planar pattern as can be seen from the schematic perspective view shown in FIG. 10. The planar patterns of these inductors may be selected arbitrarily. That is to say, the inductors do not always have to be square or circular ones but may also be rectangular or elliptical ones as well. In this description, the "feature size" of the areas occupied by the antennas refers to an inductor size of the smallest one of the antennas. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides.

In this embodiment, the first and second inductors 107a and 109a have a spiral structure, of which the numbers of turns are N1 and N2, respectively, where N1>1 and N2>1. However, the first and second inductors 107a and 109a may also have a loop structure with a number of turns of one. These inductors 107a and 109a do not have to be made of a single-layer conductor pattern but may also be a series connection of multiple conductor patterns that have been stacked one upon the other.

The first and second inductors 107a and 109a are suitably made of copper, silver or any other conductor with good electrical conductivity. As RF current with RF energy flows mostly around the surface of a conductor, the surface of the conductor may be covered with a material with high electrical conductivity to increase the power generation efficiency. If the inductors 107a and 109a are designed so as to have a cavity in the middle of its cross section, their weight can be reduced. Furthermore, if the inductors 107a and 109a are formed by adopting a parallel wiring structure with Litz wires, for example, then the conductor loss per unit length can be reduced and the Q factors of the series resonant circuit and the parallel resonant circuit can be increased. As a result, electric power can be transmitted with even higher efficiency.

To cut down the manufacturing cost, the wiring may be formed at a time by ink printing technique. If necessary, a magnetic body may be arranged near the first and/or second inductor(s) 107a, 109a. However, it is possible that inductors with an air-core spiral structure, which can set the coupling coefficient between the inductors 107a and 109a to be a moderate value, be used.

As the first and second capacitors 107b and 109b, any type of capacitors, which may have a chip shape, a lead shape or any other appropriate shape, may be used. Optionally, the capacitance produced between two levels of wires that interpose the air between them could also function as the first and second capacitors 107*b* and 109*b*. If the first and second capacitors 107*b* and 109*b* are implemented as MIM capacitors, a low-loss capacitor circuit can be formed by known semiconductor device processing or multilevel circuit board process.

Although it depends on the transmission efficiency of antenna-to-antenna electric power transmission as required by the system and the value of the coupling coefficient k, the Q factors of the resonators that are used as the power transmitting and power receiving antennas 107 and 109 should be at least 100, and are suitably set to be 200 or more, more suitably 500 or more, and even more suitably 1000 or more. To achieve such high Q factors, it is effective to adopt Litz wires as described above.

Figure 25:
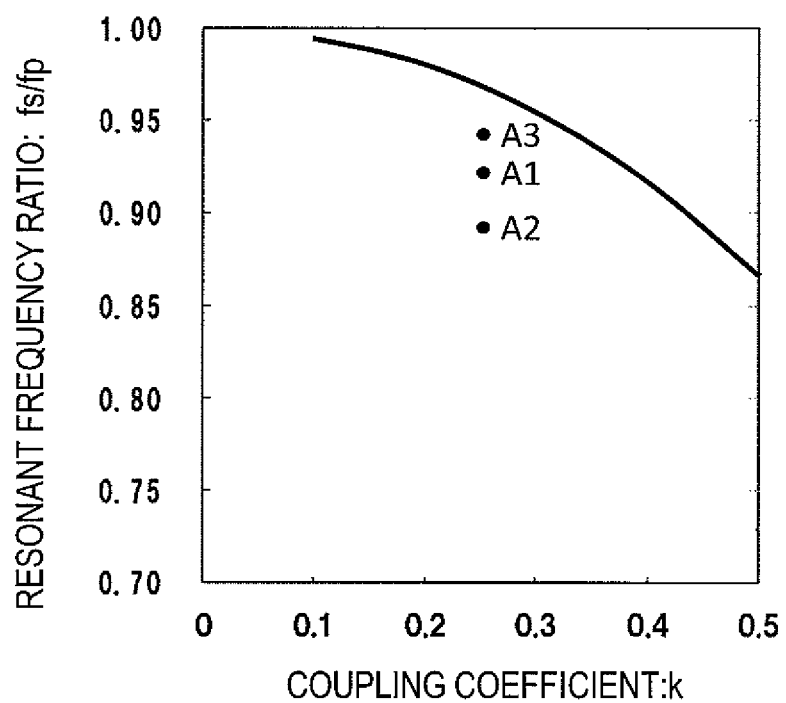
FIG. 25 is a graph showing how fs/fp may be changed.

It should be noted that if a variable frequency control function is enabled in setting the resonant frequency of the power transmitting and power receiving antennas, the fs/fp ratio can be adjusted. Hereinafter, a method for transmitting electric power even more efficiently by adopting such a variable frequency control for the power transmitting and power receiving antennas will be described with reference to FIG. 25.

First of all, in the first process step, the electric power to transmit is fixed at a certain value P3 in the vicinity of the electric power P1 and the transmission frequency is changed to sweep its entire range finely while transmitting the electric power wirelessly as a test. In this manner, the maximum transmission efficiency hmax(P3) at that electric power value P3 is detected.

Next, in the second process step, the resonant frequency ratio fs/fp of the power transmitting and power receiving antennas is changed from its initial value. If the power transmitting antenna or the power receiving antenna is provided with the function of varying and controlling the resonant frequency, the fs/fp value can also be adjusted even after the wireless electric power transmission apparatus has been installed. For example, suppose the fs/fp value that was located at the point A1 shown in FIG. 25 under the initial condition has shifted to the point A2 by changing the resonant frequency of at least one of the power transmitting and power receiving antennas. In the third process step, with the fs/fp value fixed at that point A2, the same test is carried out as in the first process step described above. As a result, the maximum transmission efficiency hmax(P3) at the electric power value P3 can be detected with the fs/fp value fixed at that point A2.

In the fourth process step, hmax(P3) that has just been obtained at the point B1 in the third process step is compared to hmax(P3) that was obtained at the point A in the first process step, thereby determining which of the two transmission conditions defined at the points A1 and A2 is preferred to the other.

It should be noted that although only a single electric power value P3 is used in the first and third process steps to detect hmax(P3), multiple electric power values P3 could also be used as well. As for the three points shown in FIG. 25, the condition defined at the point A2 includes a greater Dip than the condition defined at the point A1. That is why the condition defined at the point A1 may be chosen to make the wireless electric power transmission apparatus operate under the condition defined at the point A1. Optionally, the fs/fp value may be further shifted to the point A3 in an extra third process step and then hmax(P3) achieved with the fs/fp value at the point A3 may be compared to hmax(P3) achieved with the fs/fp value at the point A1 in an extra fourth process step.

In this manner, it can be determined which of the two transmission conditions defined at the points A1 and A3 is preferred to the other.

By measuring the maximum transmission efficiencies under multiple conditions with mutually different fs/fp values, a more appropriate fs/fp value can be obtained. As for the three points A1, A2 and A3 shown in FIG. 25, Dip becomes the smallest when the fs/fp value is located at the point A3.

Finally, in the fifth process step, the electric power to transmit is once fixed at another certain value P4 and the transmission frequency is changed to sweep its entire range finely. In this manner, the transmission efficiency fhmax that will maximize the efficiency at that electric power value P4 is detected. Furthermore, by carrying out a similar test with the electric power to transmit changed from P4, the electric power dependence of fhmax is obtained.

A pattern for controlling the transmission frequency that will maximize the transmission efficiency may be determined by operating the wireless electric power transmission apparatus as a test only in a preset part of the transmission electric power range around P1, not the entire transmission electric power range that the apparatus can possibly operate. For example, supposing it is the best measure to take to change the transmission frequency in the pattern shown in FIG. 9A, if the transmission frequency is lowered while transmitting electric power that is 10% lower than the electric power to transmit P1, a decrease in transmission efficiency can be confirmed. By performing such a test operation at a different electric power value from the electric power P1 without using the entire transmission electric power range, the adjustment process step can get done more easily. The electric power value at which the test operation is performed may be set to be lower than the electric power value P1 in order to save power.

EXAMPLES

Hereinafter, specific examples of the present disclosure and comparative examples will be described.

The power transmitting and power receiving antennas were designed so that their resonant frequency would both be a value of around 0.25 MHz. Specific design values will be described later. Each of the inductors was implemented as a Litz wire that had been formed by arranging multiple sets of 300 copper wires, each having a diameter of 80 µm, in parallel with each other so that those sets were electrically insulated from each other. The two inductors both had a circular shape with a diameter of 12 cm and their number of turns was 20, thus realizing an inductance of about 40 uH. The inductance values could be controlled by adjusting the width of the gap between the wires and the inside diameter of the inductor. The capacitor could be implemented as a stacked ceramic capacitor. In this case, the circuit on the transmitting end was implemented as a series resonant circuit, while the circuit on the receiving end was implemented as a parallel resonant circuit. The power transmitting and power receiving antennas were arranged so that their front sides would face each other and would be parallel to each other. By adjusting the gap g left between their front sides, the target coupling coefficient was realized. For example, by setting the gap to be 5.5 cm, a coupling coefficient of 0.1 was realized.

Example 1

In a situation where the coupling coefficient was 0.1, (if $fs/fp=0.99$)

power transmitting antenna's inductance: 41.64 uH,
power transmitting antenna's capacitance: 9.83 nF,
power transmitting antenna's resonant frequency fs: 245.3 kHz, power receiving antenna's inductance: 41.23 uH,
power receiving antenna's capacitance: 9.73 nF,
power receiving antenna's resonant frequency fp: 250.3 kHz,
resonant frequency fL between the pair of power transmitting and power receiving antennas: 237.8 kHz, and
resonant frequency fH between the pair of power transmitting and power receiving antennas: 263.1 kHz.

(if $fs/fp$=0.985)

power transmitting antenna's inductance: 41.74 uH,
power transmitting antenna's capacitance: 9.85 nF,
power transmitting antenna's resonant frequency fs: 244.2 kHz,
power receiving antenna's inductance: 41.11 uH,
power receiving antenna's capacitance: 9.7 nF,
power receiving antenna's resonant frequency fp: 251.8 kHz,
resonant frequency fL between the pair of power transmitting and power receiving antennas: 237.9 kHz, and
resonant frequency fH between the pair of power transmitting and power receiving antennas: 263.3 kHz.

Figure 11A:
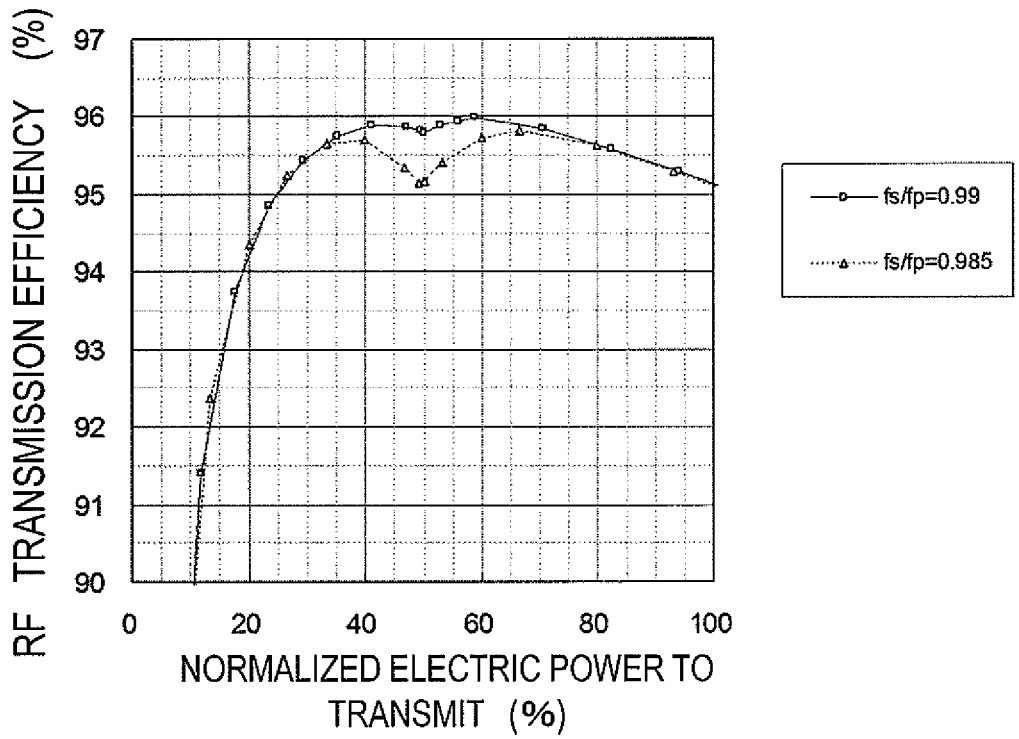
FIG. 11A is a graph showing how the transmission efficiency changes with the electric power to transmit in a situation where k=0.1.
Figure 11B:
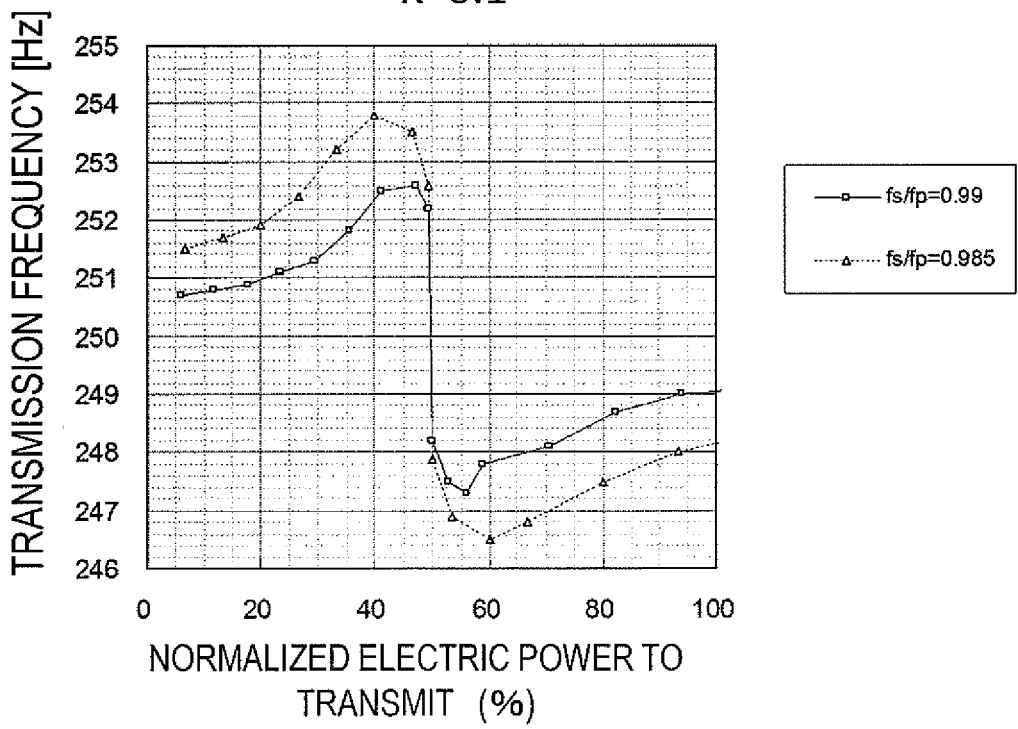
FIG. 11B is a graph showing how the transmission frequency needs to change with the electric power to transmit to achieve the transmission efficiency shown in FIG. 11A.

FIG. 11A is a graph showing how the transmission efficiency changes with the electric power to transmit in Example 1 in a situation where k=0.1. On the other hand, FIG. 11B is a graph showing how the transmission frequency needs to change with the electric power to transmit to achieve the transmission efficiency shown in FIG. 11A. In FIGS. 11A and 11B, the curves plotted with □ show the results that were obtained when fs/fp=0.99, while the curves plotted with Δ show the results that were obtained when fs/fp=0.985. Both of these fs/fp ratios are smaller than the reference value indicated by the function F(k) of Equation (2). As can be seen from FIG. 11A, at a normalized transmission power of approximately 50%, a local decrease in transmission efficiency was observed in one Dip rate. However, both of these Dip rates were equal to or smaller than 1%. The transmission frequency changed as shown in FIG. 11B. The mode of this change has the patterns shown in FIG. 9B.

Example 2

In a situation where the coupling coefficient was 0.2, (if $fs/fp$==0.957)

power transmitting antenna's inductance: 41.94 uH,
power transmitting antenna's capacitance: 9.90 nF,
power transmitting antenna's resonant frequency fs: 241.9 kHz,
power receiving antenna's inductance: 41.49 uH,
power receiving antenna's capacitance: 9.15 nF,
power receiving antenna's resonant frequency fp: 264.3 kHz,
resonant frequency fL between the pair of power transmitting and power receiving antennas: 229.6 kHz, and
resonant frequency fH between the pair of power transmitting and power receiving antennas: 282.6 kHz.

(if $fs/fp$=0.943)

power transmitting antenna's inductance: 41.52 uH,
power transmitting antenna's capacitance: 9.8 nF,
power transmitting antenna's resonant frequency fs: 246.8 kHz,
power receiving antenna's inductance: 40.51 uH,
power receiving antenna's capacitance: 8.94 nF,
power receiving antenna's resonant frequency fp: 277.3 kHz,
resonant frequency fL between the pair of power transmitting and power receiving antennas: 233.1 kHz, and
resonant frequency fH between the pair of power transmitting and power receiving antennas: 287.8 kHz.

Figure 12A:
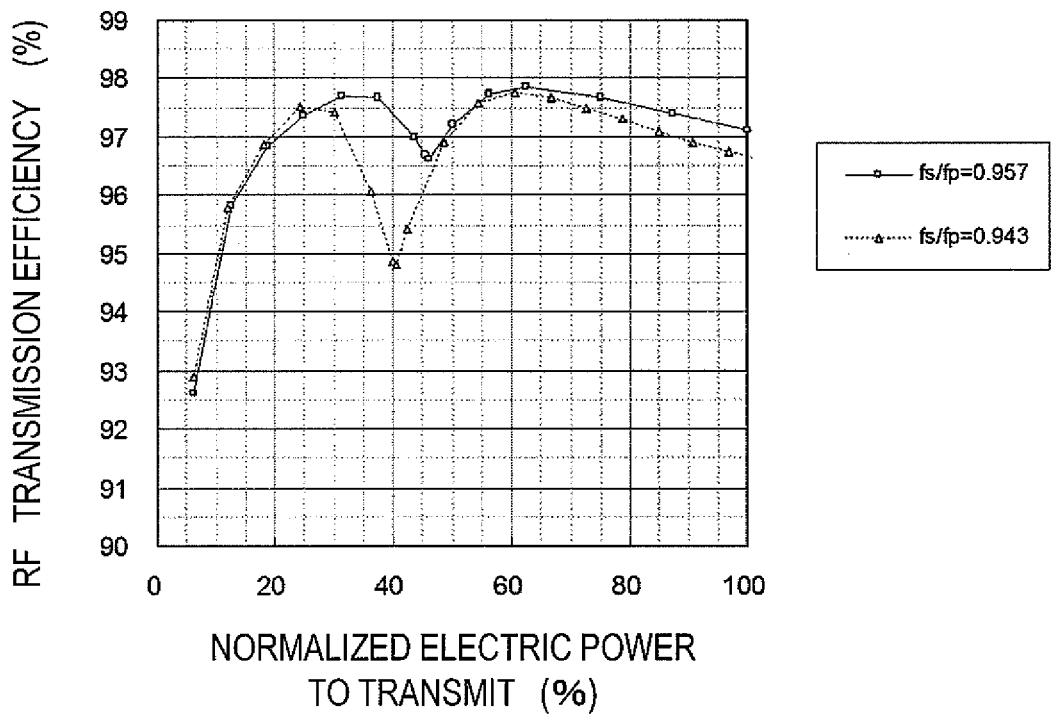
FIG. 12A is a graph showing how the transmission efficiency changes with the electric power to transmit in a situation where k=0.2.
Figure 12B:
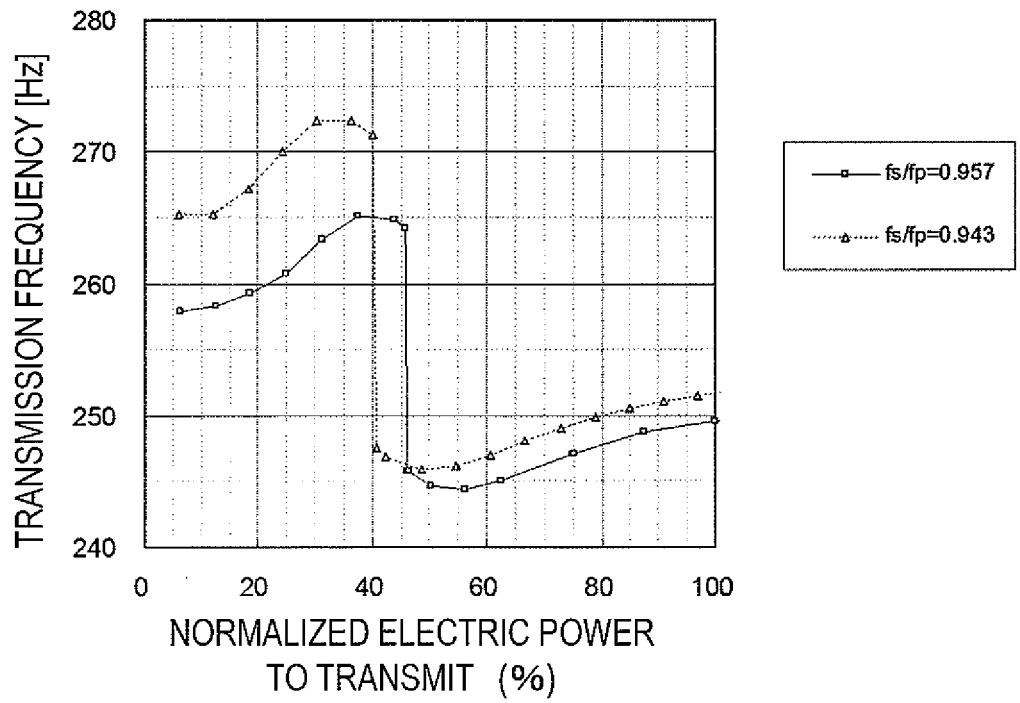
FIG. 12B is a graph showing how the transmission frequency needs to change with the electric power to transmit to achieve the transmission efficiency shown in FIG. 12A.

FIG. 12A is a graph showing how the transmission efficiency changes with the electric power to transmit in Example 1 in a situation where k==0.2. On the other hand, FIG. 12B is a graph showing how the transmission frequency needs to change with the electric power to transmit to achieve the transmission efficiency shown in FIG. 12A. In FIGS. 12A and 12B, the curves plotted with □ show the results that were obtained when fs/fp==0.957, while the curves plotted with Δ show the results that were obtained when fs/fp==0.943. Both of these fs/fp ratios are smaller than the reference value indicated by the function F(k) of Equation (2). As can be seen from FIG. 12A, at a normalized transmission power of approximately 40-50%, a local decrease in transmission efficiency was observed in one Dip rate. However, both of these Dip rates were equal to or smaller than approximately 3%. The transmission frequency changed as shown in FIG. 12B. The mode of this change has the patterns shown in FIG. 9B.

Example 3

In a situation where the coupling coefficient was 0.3, (if $fs/fp$=0.922)

power transmitting antenna's inductance: 42.85 uH,
power transmitting antenna's capacitance: 10.11 nF,
power transmitting antenna's resonant frequency fs: 231.7 kHz,
power receiving antenna's inductance: 39.5 uH,
power receiving antenna's capacitance: 9.32 nF,
power receiving antenna's resonant frequency fp: 272.6 kHz,
resonant frequency fL between the pair of power transmitting and power receiving antennas: 219.3 kHz, and
resonant frequency fH between the pair of power transmitting and power receiving antennas: 302 kHz.

(if $fs/fp$=0.894)

power transmitting antenna's inductance: 44.53 uH,
power transmitting antenna's capacitance: 10.51 nF,
power transmitting antenna's resonant frequency fs: 214.6 kHz,
power receiving antenna's inductance: 39.83 uH,
power receiving antenna's capacitance: 9.4 nF,
power receiving antenna's resonant frequency fp: 268.2 kHz,
resonant frequency fL between the pair of power transmitting and power receiving antennas: 194.9 kHz, and
resonant frequency fH between the pair of power transmitting and power receiving antennas: 300.1 kHz.

FIG. 13A is a graph showing how the transmission efficiency changes with the electric power to transmit in Example 1 in a situation where k==0.3. On the other hand, FIG. 13B is a graph showing how the transmission frequency needs to change with the electric power to transmit to achieve the transmission efficiency shown in FIG. 13A. In FIGS. 13A and 13B, the curves plotted with □ show the results that were obtained when fs/fp==0.922, while the curves plotted with Δ show the results that were obtained when fs/fp==0.894. Both of these fs/fp ratios are smaller than the reference value indicated by the function F(k) of Equation (2). As can be seen from FIG. 13A, at a normalized transmission power of approximately 40-50%, a local decrease in transmission efficiency was observed in one Dip rate. If fs/fp==0.894, the Dip rate was more than 3%. The transmission frequency changed as shown in FIG. 13B. The mode of this change has the patterns shown in FIG. 9B.

Example 4

In a situation where the coupling coefficient was 0.4, (if $fs/fp==0.866$)

power transmitting antenna's inductance: 47.99 uH,
power transmitting antenna's capacitance: 11.32 nF,
power transmitting antenna's resonant frequency fs: 184.7 kHz,
power receiving antenna's inductance: 41.56 uH,
power receiving antenna's capacitance: 9.81 nF,
power receiving antenna's resonant frequency fp: 246.4 kHz,
resonant frequency fL between the pair of power transmitting and power receiving antennas: 194.9 kHz, and
resonant frequency fH between the pair of power transmitting and power receiving antennas: 300.1 kHz.

(if $fs/fp=0.837$)

power transmitting antenna's inductance: 43.02 uH,
power transmitting antenna's capacitance: 10.15 nF,
power transmitting antenna's resonant frequency fs: 229.9 kHz,
power receiving antenna's inductance: 35.99 uH,
power receiving antenna's capacitance: 8.49 nF,
power receiving antenna's resonant frequency fp: 328.4 kHz,
resonant frequency fL between the pair of power transmitting and power receiving antennas: 220.1 kHz, and
resonant frequency fH between the pair of power transmitting and power receiving antennas: 340.8 kHz.

FIG. 14A is a graph showing how the transmission efficiency changes with the electric power to transmit in Example 1 in a situation where k=0.4. On the other hand, FIG. 14B is a graph showing how the transmission frequency needs to change with the electric power to transmit to achieve the transmission efficiency shown in FIG. 14A. In FIGS. 14A and 14B, the curves plotted with □ show the results that were obtained when fs/fp=0.866, while the curves plotted with Δ show the results that were obtained when fs/fp=0.837. Both of these fs/fp ratios are smaller than the reference value indicated by the function F(k) of Equation (2). As can be seen from FIG. 14A, at a normalized transmission power of approximately 30-60%, a local decrease in transmission efficiency was observed in one Dip rate. If fs/fp=0.894, the Dip rate was more than 3%. The transmission frequency changed as shown in FIG. 14B. The mode of this change has the patterns shown in FIG. 9B.

Example 5

In a situation where the coupling coefficient was 0.5, (if $fs/fp==0.854$)

power transmitting antenna's inductance: 15.86 uH,
power transmitting antenna's capacitance: 33.94 nF,
power transmitting antenna's resonant frequency fs: 186.5 kHz,
power receiving antenna's inductance: 63.02 uH,
power receiving antenna's capacitance: 6.23 nF,
power receiving antenna's resonant frequency fp: 255.5 kHz,
resonant frequency fL between the pair of power transmitting and power receiving antennas: 190.2 kHz, and
resonant frequency fH between the pair of power transmitting and power receiving antennas: 331.2 kHz.

(if $fs/fp==0.837$)

power transmitting antenna's inductance: 15.86 uH,
power transmitting antenna's capacitance: 33.94 nF,
power transmitting antenna's resonant frequency fs: 186.5 kHz,
power receiving antenna's inductance: 61.71 uH,
power receiving antenna's capacitance: 6.11 nF,
power receiving antenna's resonant frequency fp: 266.5 kHz,
resonant frequency fL between the pair of power transmitting and power receiving antennas: 195.3 kHz, and
resonant frequency fH between the pair of power transmitting and power receiving antennas: 335.1 kHz.

Figure 15A:
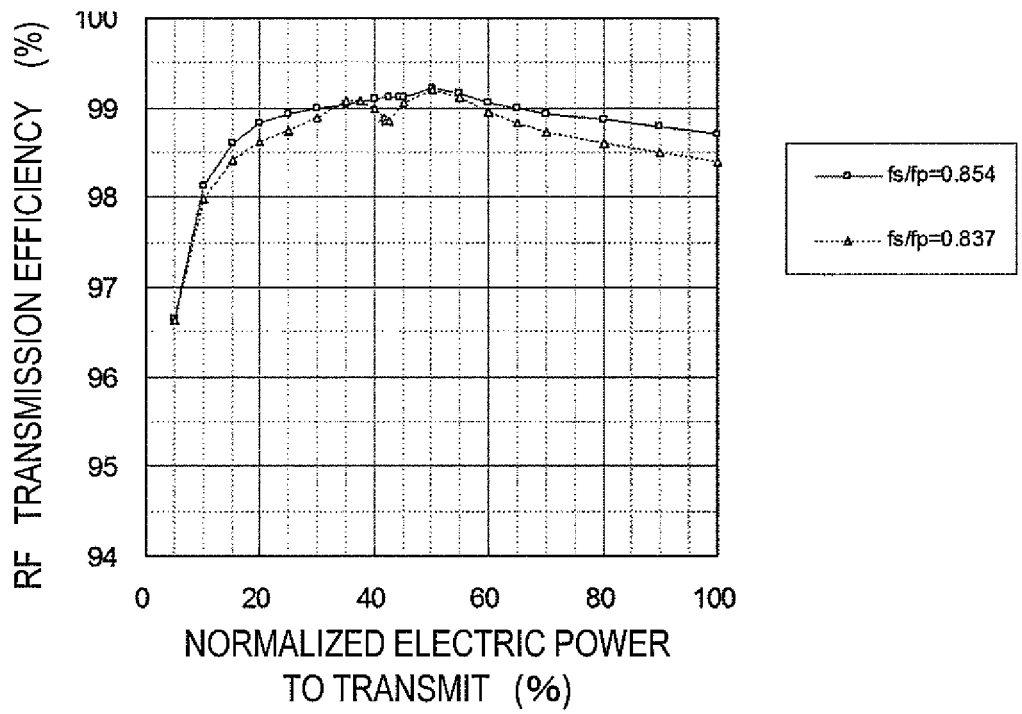
FIG. 15A is a graph showing how the transmission efficiency changes with the electric power to transmit in a situation where k=0.5.
Figure 15B:
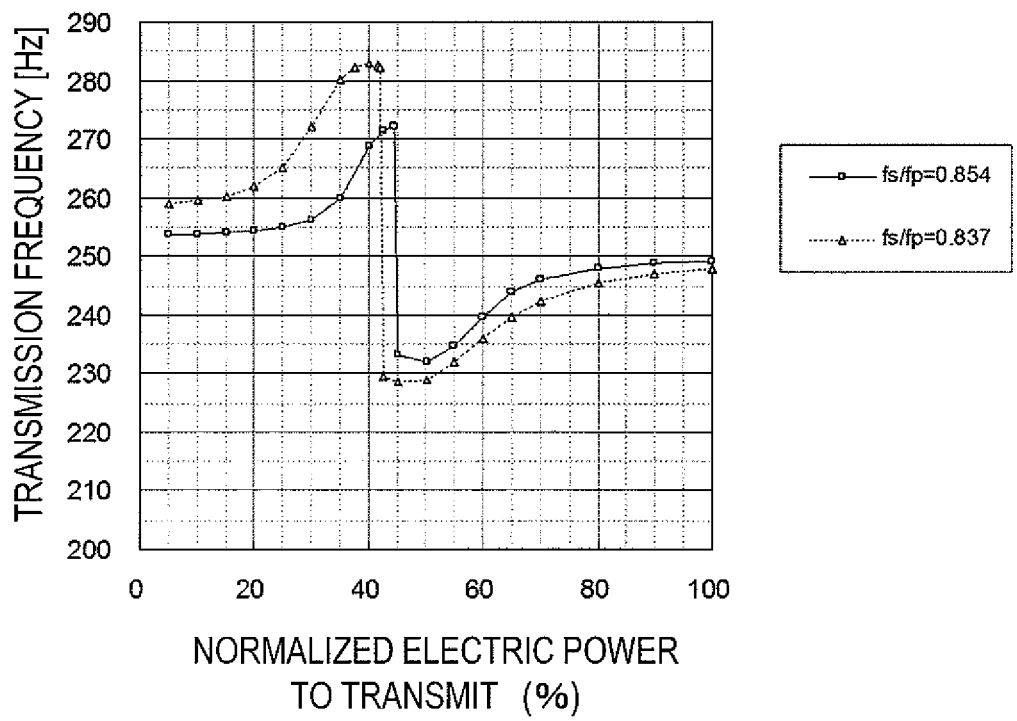
FIG. 15B is a graph showing how the transmission frequency needs to change with the electric power to transmit to achieve the transmission efficiency shown in FIG. 15A.

FIG. 15A is a graph showing how the transmission efficiency changes with the electric power to transmit in Example 1 in a situation where k=0.5. On the other hand, FIG. 15B is a graph showing how the transmission frequency needs to change with the electric power to transmit to achieve the transmission efficiency shown in FIG. 15A. In FIGS. 15A and 15B, the curves plotted with □ show the results that were obtained when fs/fp=0.854, while the curves plotted with Δ show the results that were obtained when fs/fp=0.837. Both of these fs/fp ratios are smaller than the reference value indicated by the function F(k) of Equation (2). As can be seen from FIG. 15A, almost no Dip was observed. The transmission frequency changed as shown in FIG. 15B. The mode of this change has the patterns shown in FIG. 9B.

Figure 16:
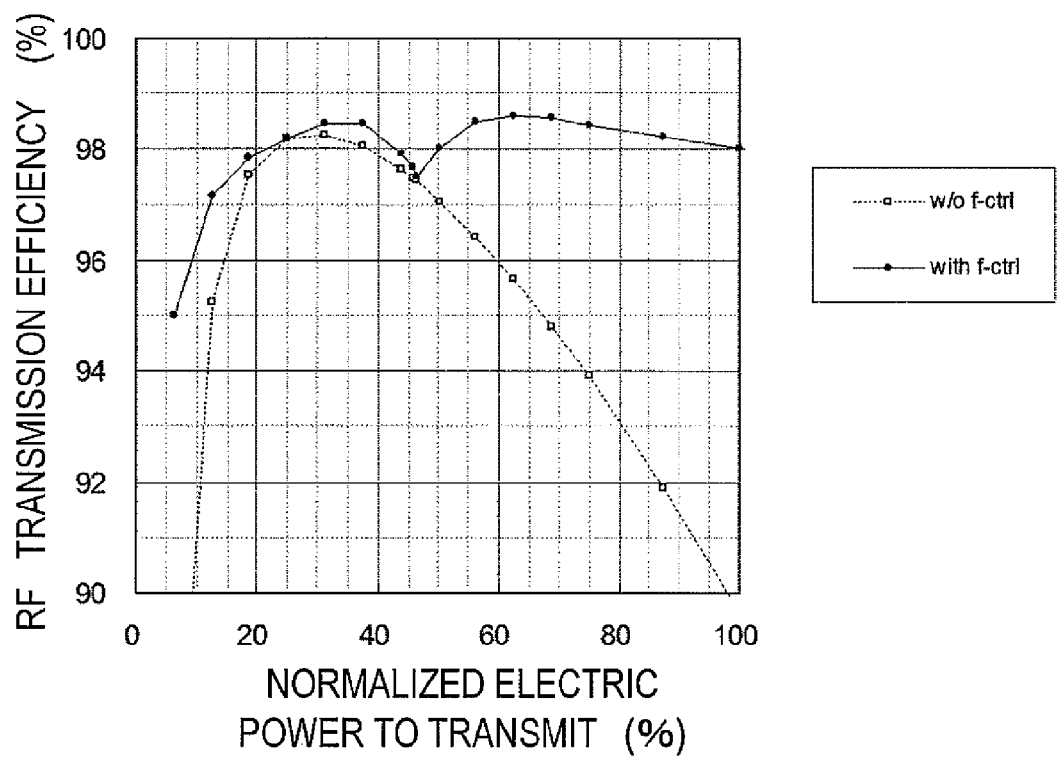
FIG. 16 is a graph showing how the transmission efficiency changes when the transmission frequency is controlled (with f-ctrl) and when the transmission frequency is not controlled (w/o f-ctrl) in a situation where k=0.3 and fs/fp=0.922.

FIG. 16 is a graph showing how the transmission efficiency changes when the transmission frequency is controlled (with f-ctrl) and when the transmission frequency is not controlled (w/o f-ctrl) in a situation where k=0.3 and fs/fp=0.922. Unless the transmission frequency is controlled, a steep decrease in transmission efficiency is seen in a range where the electric power to transmit is relatively large. It can be seen, however, that if the transmission frequency is controlled and changed as shown in FIG. 9B, the transmission efficiency when a lot of electric power is transmitted can be improved significantly.

Comparative Examples 1 and 2

Figure 17:
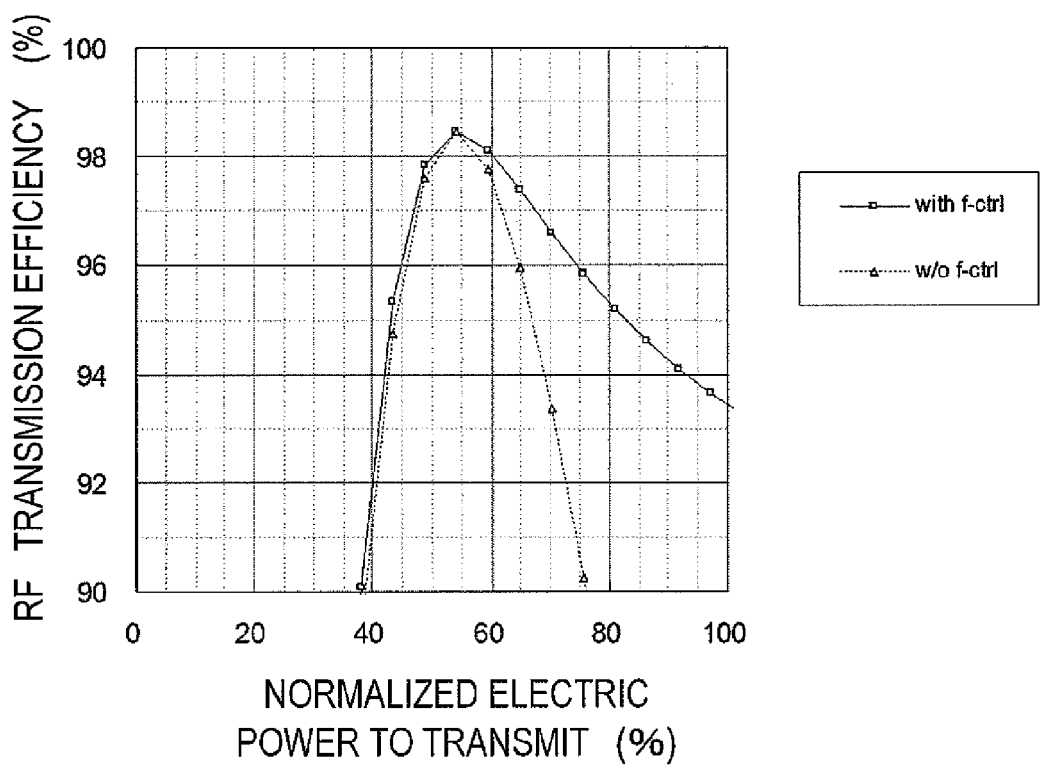
FIG. 17 shows the dependence of the transmission efficiency on the electric power to transmit in Comparative Example 1.

Although the power transmitting and power receiving antennas of Example 1 have an asymmetric resonant circuit configuration, the power transmitting and power receiving antennas had a symmetric resonant circuit configuration in these Comparative Examples 1 and 2. Specifically, in Comparative Example 1, both of the power transmitting and power receiving antennas were implemented as series resonant circuits. On the other hand, in Comparative Example 2, both of the power transmitting and power receiving antennas were implemented as parallel resonant circuits. In these comparative examples, evaluations were made in the same way as in Example 1, thereby deriving the maximum transmission efficiency at each electric power to transmit when the apparatus was operated with a constant voltage applied and a transmission frequency that would maximize the transmission efficiency (peak frequency). In this case, k was set to be 0.3 and fs/fp was set to be 0.922. FIG. 17 shows the dependence of the transmission efficiency on the electric power to transmit in Comparative Example 1. As can be seen easily from FIG. 17, the transmission efficiency is high only in a narrow range in Comparative Example 1. Also, even if the transmission frequency is controlled, the transmission efficiency is improved only a little.

Figure 18:
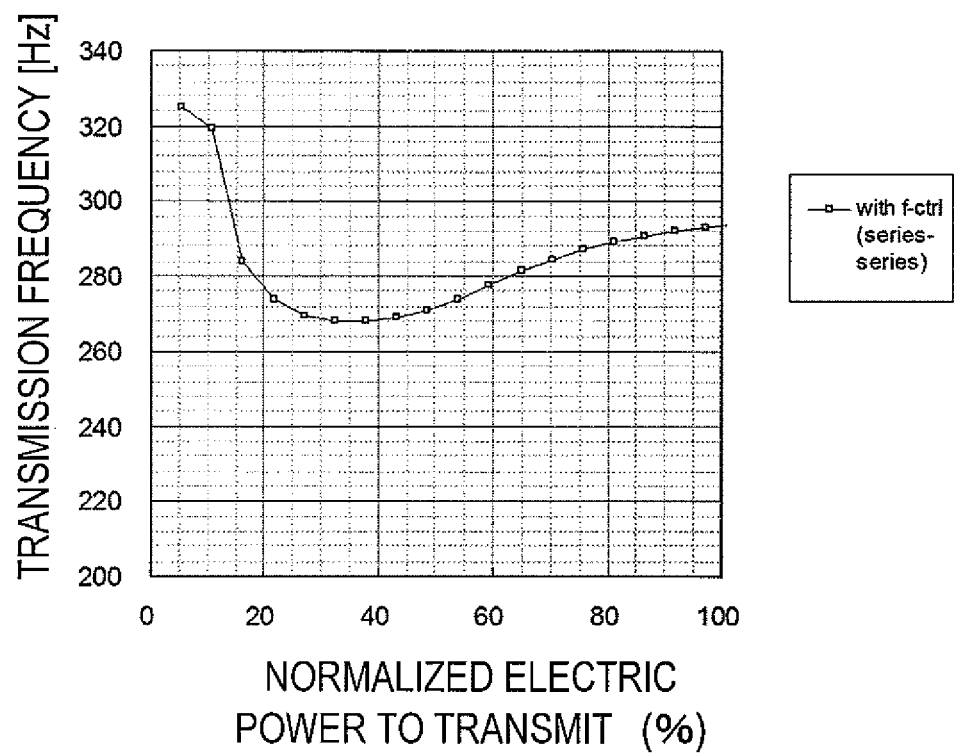
FIG. 18 is a graph showing how the transmission frequency changes with the electric power to transmit in Comparative Example 1.
Figure 19:
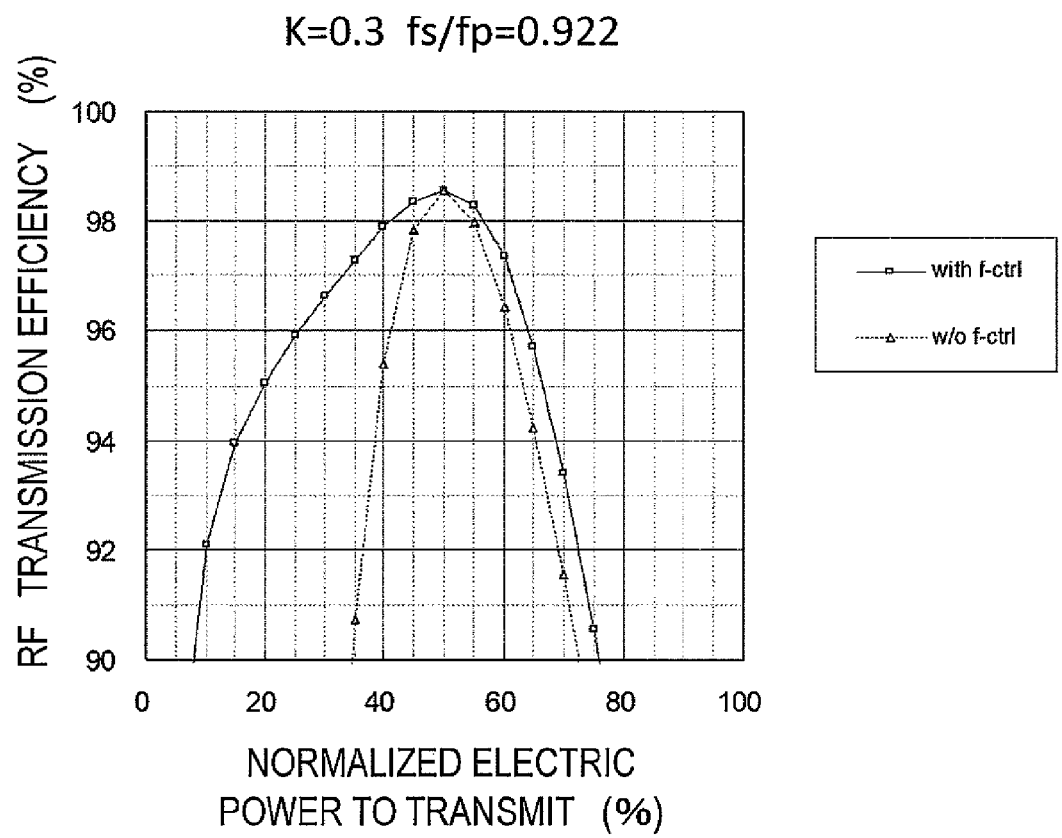
FIG. 19 shows the dependence of the transmission efficiency on the electric power to transmit in Comparative Example 2.
Figure 20:
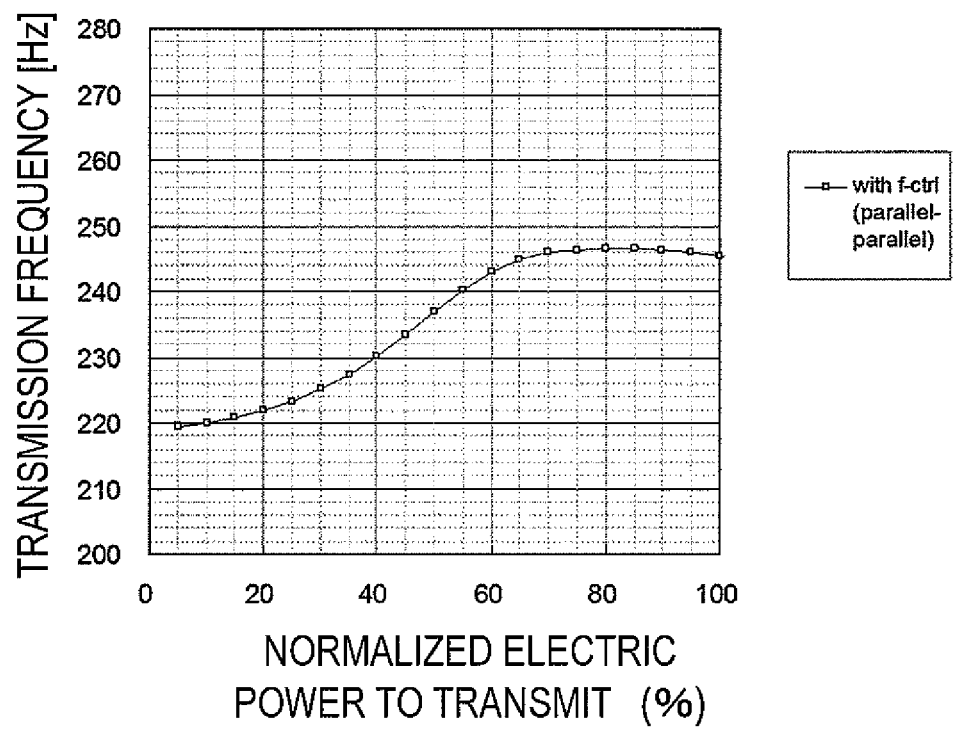
FIG. 20 is a graph showing how much the transmission frequency depends on the electric power to transmit in Comparative Example 2.

FIG. 18 is a graph showing how the transmission frequency changes with the electric power to transmit in Comparative Example 1. As can be seen easily from FIG. 18, in Comparative Example 1, as the electric power to transmit decreases, the transmission frequency becomes far higher than the even mode resonant frequency of 302 kHz, which did not follow the frequency control condition of the present disclosure. The transmission efficiency of Comparative Example 2, of which the power transmitting and power receiving antennas were both implemented as parallel resonant circuits, is shown in FIG. 19 and the dependence of its transmission frequency on the electric power to transmit is shown in FIG. 20. As can be seen from these drawings, the effects of the embodiment of the present disclosure were not achieved in Comparative Example 2, either.

Comparative Example 3

Figure 21:
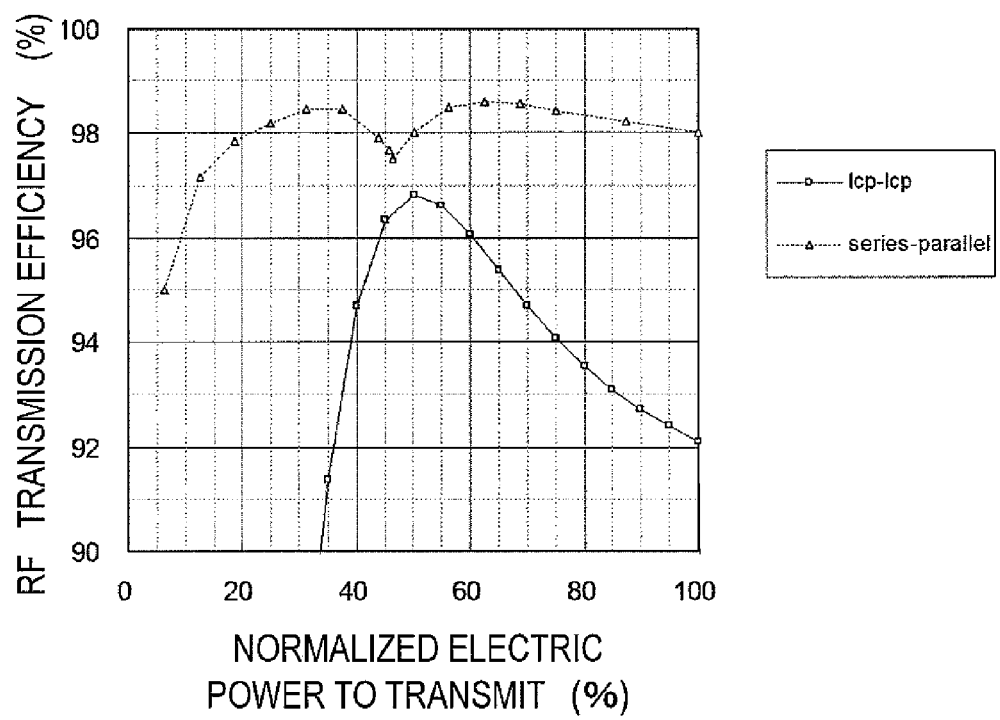
FIG. 21 is a graph showing the dependences of the transmission efficiency on the electric power to transmit in Comparative Example 3 and in Example 1
Figure 22:
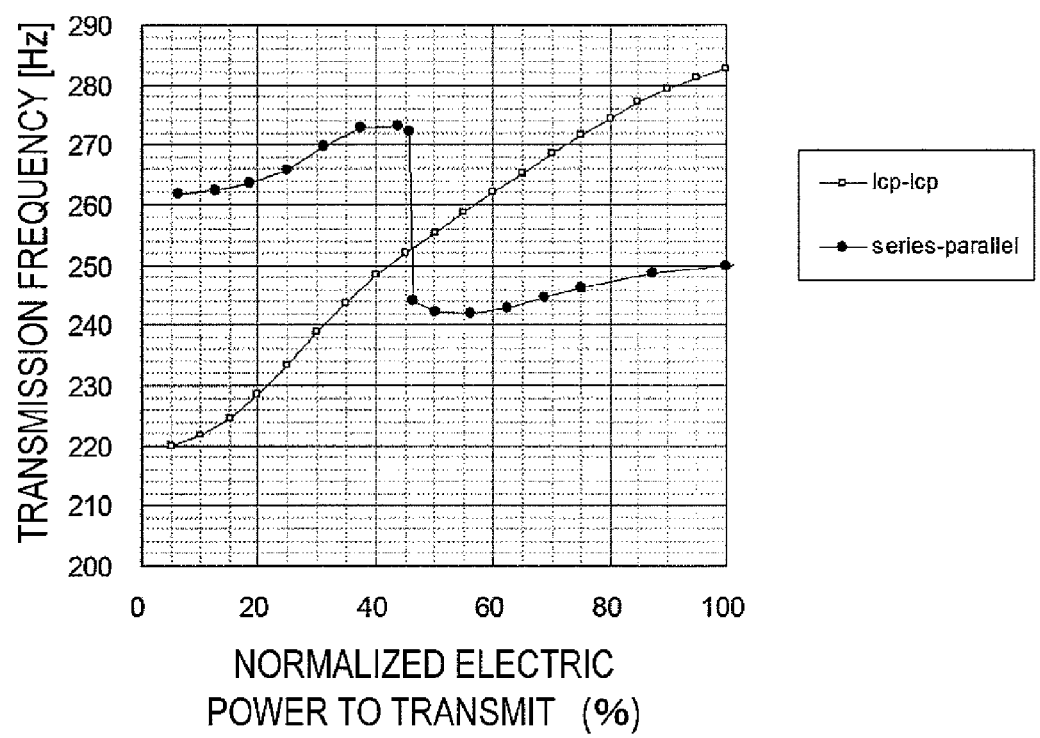
FIG. 22 is a graph showing the dependences of the transmission frequency on the electric power to transmit in Comparative Example 3 and in Example 1

In Example 1, a signal is supplied from an external circuit to the power transmitting and power receiving antennas by directly connecting an RF input/output terminal for measuring to the power transmitting and power receiving antennas. In this Comparative Example 3, on the other hand, a signal was supplied from an external circuit to the power transmitting and power receiving antennas based on the principle of electromagnetic induction. Specifically, a pair of non-resonant coils, which were arranged 3 mm away from the power transmitting and power receiving antennas to face each other and which each had a diameter of 20 cm and a number of turns of six, were used and excited by an external circuit, thereby exciting the power transmitting and power receiving antennas with the non-resonant coils by a non-contact method. Then, evaluation was made in the same way as in Example 1, thereby calculating not only the maximum transmission efficiency at each electric power to transmit during a constant voltage operation but also a transmission frequency that would maximize the transmission efficiency. The dependences of the transmission efficiency on the electric power to transmit in this Comparative Example 3 and in Example 1 are shown in FIG. 21. As can be seen from FIG. 21, in Comparative Example 3, as the electric power to transmit decreases, the maximum transmission efficiency decreases steeply. Also, as can be seen from FIG. 22, in Comparative Example 3, as the electric power to transmit increases, the transmission frequency rises monotonically, which did not follow the frequency control condition of the embodiment of the present disclosure. This result reveals that the configuration of Comparative Example 3 copes with a variation in electric power to transmit by using only an odd-mode resonance. That is to say, this proved that the principle of operation of Comparative Example 3 was different from that of the embodiment of the present disclosure that makes full use of the even and odd resonance modes.

Comparative Examples 4 and 5

In Comparative Examples 4 and 5, electric power was supplied directly to one of the power transmitting and power receiving antennas but supplied to the other antenna by electromagnetic induction. The direct power supply was carried out under the same condition as in Example 1, while the power supply by electromagnetic induction was carried out under the same condition as in Comparative Example 3. The following Table 1 summarizes the respective circuit configurations of Example 1 and Comparative Examples 1 to 5 in comparison.

Figure 23:
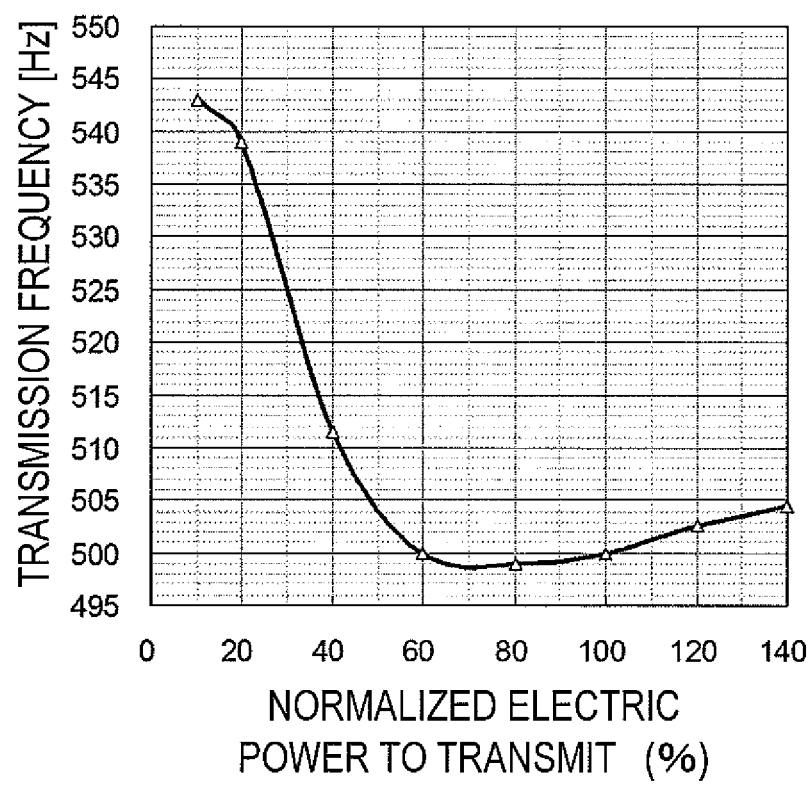
FIG. 23 shows the dependence of the transmission efficiency on the electric power to transmit in Comparative Example 4.
Figure 24:
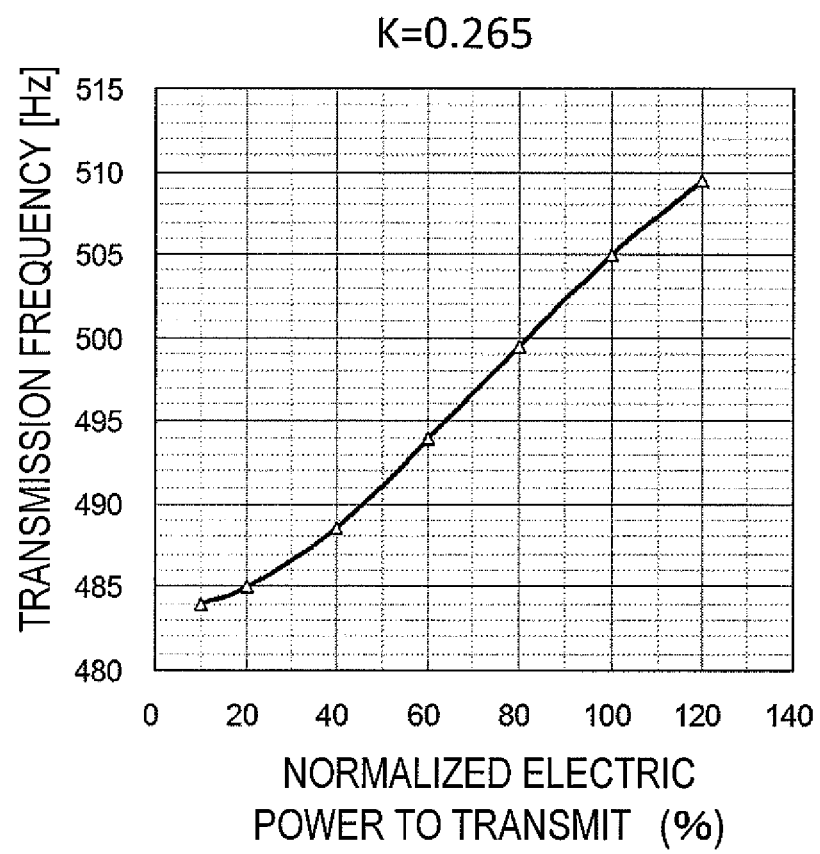
FIG. 24 is a graph showing how much the transmission frequency depends on the electric power to transmit in Comparative Example 5.

As for Comparative Examples 4 and 5, evaluation was made in the same way as in Example 1, thereby calculating not only the maximum transmission efficiency at each electric power to transmit during a constant voltage operation but also a transmission frequency that would maximize the transmission efficiency. As can be seen easily from FIG. 23, in Comparative Example 4, as the electric power to transmit decreases, the transmission frequency tends to rise, which did not follow the frequency control condition of the embodiment of the present disclosure. Likewise, as can be seen easily from FIG. 24, which shows the dependence of the transmission frequency on the electric power to transmit in Comparative Example 5, the frequency control condition of the embodiment of the present disclosure was not satisfied in Comparative Example 5, either.

TABLE 1

| | Distance (cm) | k | Power transmitting antenna | Power receiving antenna | Effect of this invention/ frequency control |
|---|---|---|---|---|---|
| Example 1 | | | Series resonant circuit | Parallel resonant circuit | Achieved/ satisfied |
| Com. Ex. 1 | 5 | 0.265 | Series resonant circuit | Series resonant circuit | |
| Com. Ex. 2 | | | Parallel resonant circuit | Parallel resonant circuit | Not achieved/ not satisfied |
| Com. Ex. 3 | | | Electromagnetic induction power supply type | Electromagnetic induction power supply type | |
| Com. Ex. 4 | | | | Series resonant circuit | |
| Com. Ex. 5 | | | | Parallel resonant circuit | |

A wireless electric power transmission apparatus as an embodiment of the present disclosure can be used as a power supplying system for supplying power to various devices (including a TV set and other audiovisual devices and washers, refrigerators, air conditioners and other household electronic appliances) which can operate with power supplied from a power supply circuit that applies a constant voltage.

In addition, the wireless electric power transmission apparatus of the present disclosure is also applicable as a charging system for various electronic devices, electric motorcycles, electric bicycles, and electric cars that use a rechargeable battery. This is because a rechargeable battery such as a lithium battery sometimes needs to have its charge operation controlled at a constant voltage. Furthermore, the system of the present disclosure is also applicable for use in any electronic device with a motor to be driven at a constant voltage.

Moreover, it is known that if the intensity (or illuminance) of sunlight that irradiates a solar cell in a solar power generation system changes, the maximum power point (i.e., a current or voltage value at which the maximum power can be generated) is substantially proportional to illuminance as for current and becomes almost constant as for voltage. Consequently, a wireless electric power transmission apparatus as an embodiment of the present disclosure is also applicable to a system that collects the power that has been generated by a solar power generation system.

While the exemplary embodiments of the invention has been described, it will be apparent to those skilled in the art that the disclosed exemplary embodiments may be modified in numerous ways and may assume many embodiments other than those specifically described above. Accordingly, it is intended by the appended claims to cover all modifications of the exemplary embodiments that fall within the true spirit and scope of the invention.

What is claimed is:

1. A wireless electric power transmission apparatus comprising:
   two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp;
   an oscillator which is connected to one of the two antennas that transmits RF power; and
   a control section which controls a transmission frequency according to the magnitude of the electric power to be transmitted from one of the two antennas to the other,
   wherein if a coupling coefficient between the two antennas is k, then fs and fp are set so as to satisfy the inequality $fs/fp < -0.6074 \times k^2 + 0.0466 \times k + 0.9955$.

2. The wireless electric power transmission apparatus of claim 1, wherein the control section sets the transmission frequency to be a value that falls within a first frequency range if the electric power is greater than a reference value P1 but sets the transmission frequency to be a value that falls within a second frequency range, which is higher than the first frequency range, if the electric power is smaller than the reference value P1.

3. The wireless electric power transmission apparatus of claim 1, wherein if the electric power has changed from a value that is greater than the reference value P1 into a value that is smaller than the reference value P1 or if the electric power has changed from a value that is smaller than the reference value P1 into a value that is greater than the reference value P1, then the control section makes the transmission frequency hop between a value falling within the first frequency range and a value falling within the second frequency range.

4. The wireless electric power transmission apparatus of claim 3, wherein in making the transmission frequency hop, the control section changes the modes of a resonant magnetic field, which couples the two antennas together, from an even mode into an odd mode, and vice versa.

5. The wireless electric power transmission apparatus of claim 1, wherein the coupling coefficient k between the two antennas is kept constant while the electric power is being transmitted.

6. The wireless electric power transmission apparatus of claim 1, wherein the reference value P1 is set to be within the range of 60% to 80% of a maximum electric power to transmit Pmax.

7. The wireless electric power transmission apparatus of claim 1, wherein when one of the two antennas that is located on a receiving end has its output terminal connected to a load that follows the antenna, the output impedance Zoc of the oscillator that supplies RF energy to the other antenna on a transmitting end is equal to the input impedance Zin of the power transmitting antenna.

8. The wireless electric power transmission apparatus of claim 1, wherein when one of the two antennas that is located on the transmitting end has its input terminal connected to an output terminal of the oscillator, the output impedance Zout of the other antenna on the receiving end is equal to the input impedance of a load that is connected to the output of the antenna on the receiving end.

9. The wireless electric power transmission apparatus of claim 1, wherein the control section estimates whether transmission efficiency increases or decreases as the transmission frequency rises or falls with respect to at least one value of the electric power to transmit and determines a control pattern for the transmission frequency based on the result of the estimation.

10. The wireless electric power transmission apparatus of claim 1, wherein the two antennas have a resonant frequency adjustment function to change at least one of fs and fp, and
    wherein the control section changes the fs/fp value after the wireless electric power transmission apparatus has been installed.

11. The wireless electric power transmission apparatus of claim 10, wherein after the wireless electric power transmission apparatus has been installed, the control section transmits electric power wirelessly with fs/fp set to be multiple different values, measures transmission efficiency, and then determines an fs/fp value for a normal operation based on the transmission efficiency.

12. A power transmitting device for use in the wireless electric power transmission apparatus of claim 1, comprising:
    one of the two antennas configured to transmit RF power; and
    an oscillator that is connected to the antenna.

13. A power receiving device for use in the wireless electric power transmission apparatus of claim 1, comprising one of the two antennas configured to receive RF power.

14. A controller for use in the wireless electric power transmission apparatus of claim 1, configured to control the resonant frequency according to the magnitude of the electric power to be transmitted from one of the two antennas to the other.

* * * * *